US008149848B2

(12) United States Patent
Karaoguz et al.

(10) Patent No.: US 8,149,848 B2
(45) Date of Patent: *Apr. 3, 2012

(54) ENHANCED CALLER ID INFORMATION BASED ON ACCESS DEVICE INFORMATION VIA A BROADBAND ACCESS GATEWAY

(75) Inventors: Jeyhan Karaoguz, Irvine, CA (US); Marc Abrams, Aliso Viejo, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 372 days.

This patent is subject to a terminal disclaimer.

(21) Appl. No.: 12/433,637

(22) Filed: Apr. 30, 2009

(65) Prior Publication Data

US 2009/0209241 A1 Aug. 20, 2009

Related U.S. Application Data

(63) Continuation of application No. 11/095,376, filed on Mar. 30, 2005, now Pat. No. 7,536,177.

(60) Provisional application No. 60/563,894, filed on Apr. 16, 2004.

(51) Int. Cl.
*H04L 12/28* (2006.01)

(52) U.S. Cl. ............... 370/395.71; 455/415; 455/403; 455/414.1; 379/88.19; 379/88.2; 379/88.21; 370/352; 370/401; 370/328

(58) Field of Classification Search ............ 455/415, 455/403, 414.1; 379/88.19, 88.2, 88.21; 370/352, 401, 328, 395.71
See application file for complete search history.

(56) References Cited

U.S. PATENT DOCUMENTS

| 5,995,843 | A | 11/1999 | Sjodin |
| 6,687,242 | B1 | 2/2004 | Enzmann |
| 2002/0021465 | A1 | 2/2002 | Moore |
| 2003/0022659 | A1 | 1/2003 | Mun |
| 2003/0063731 | A1 | 4/2003 | Woodring |
| 2003/0133553 | A1 | 7/2003 | Khakoo |
| 2003/0171113 | A1 | 9/2003 | Choi |
| 2003/0185365 | A1 | 10/2003 | Mansfield |
| 2005/0055213 | A1 | 3/2005 | Claudatos |
| 2005/0190792 | A1 | 9/2005 | Dunk |
| 2005/0198525 | A1 | 9/2005 | Trossen |

FOREIGN PATENT DOCUMENTS

| EP | 0869688 | 10/1998 |
| EP | 1028575 | 8/2000 |
| EP | 1051021 | 11/2000 |
| EP | 1109386 | 6/2001 |
| EP | 1143667 | 10/2001 |
| EP | 1333395 | 8/2003 |
| EP | 1347625 | 9/2003 |
| WO | 02063900 | 8/2002 |

*Primary Examiner* — Justin Lee
(74) *Attorney, Agent, or Firm* — Brinks Hofer Gilson & Lione

(57) ABSTRACT

A system and method for providing enhanced information to a user is described. A broadband access gateway communicatively coupled to a plurality of access devices may collect information about multimedia content available on the access devices and/or information exchanged with access devices. The gateway may search the collect information upon receiving information identifying a called or calling party, to find information that may be associated with the called or calling party. Selected items of the information associated with the called or calling party may then be delivered to the access device of the called or calling party. Information accessible to the gateway via a broadband connection may also be made available to the user of the access device.

75 Claims, 7 Drawing Sheets

ENHANCED CALLER ID INFORMATION BASED ON ACCESS DEVICE INFORMATION VIA A BROADBAND ACCESS GATEWAY

RELATED APPLICATIONS

The present application is a continuation of U.S. application Ser. No. 11/095,376, entitled "Enhanced Caller ID Information Based on Access Device Information Via A Broadband Access Gateway," filed Mar. 30, 2005, which, in turn, claims priority to, and benefit of U.S. Provisional Patent Application Ser. No. 60/563,894, entitled "Method And System For Handling And Backhauling Traffic From A Wired And/Or Wireless WAN, LAN, And/Or PAN Using A Broadband Access Gateway," filed Apr. 16, 2004, both of which are hereby incorporated by reference, in their entireties.

The present application also makes reference to U.S. patent application Ser. No. 11/021,294, entitled "Method And System For Extended Network Access Services Advertising Via A Broadband Access Gateway," filed Dec. 23, 2004, the complete subject matter of which is hereby incorporated by reference, in its entirety.

The present application also makes reference to U.S. patent application Ser. No. 11/039,020, entitled "Method And System For Providing Registration, Authentication, And Access Via A Broadband Access Gateway," filed Jan. 18, 2005, the complete subject matter of which is hereby incorporated by reference, in its entirety.

The present application also makes reference to U.S. patent application Ser. No. 11/095,842, entitled "Registering Access Device Multimedia Content Via a Broadband Access Gateway," filed Mar. 30, 2005, the complete subject matter of which is hereby incorporated by reference, in its entirety.

The present application also makes reference to U.S. patent application Ser. No. 11/095,188, entitled "Location-Aware Application Based Quality of Service (QoS) Via A Broadband Access Gateway," filed Mar. 30, 2005 the complete subject matter of which is hereby incorporated by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

One major common problem faced by cellular and landline service providers is market competition. In today's climate of competitive markets, cellular service providers have found that one way for them to grow market share and defend their businesses is to be proactive and form alliances, and to partner with landline service providers. In addition, cellular service providers seek to differentiate their service offerings, and to capture the largest portion of market revenue by meeting an ever increasing demand for access to a wide range of media forms such as MP3 encoded audio, still and video imaging, data, instant messaging, and email. In a similar manner, the landline service providers have found that to grow market share and ward off competition, they too must be proactive and form alliances, and to partner with cellular service providers. Support for broad economical access to these converging forms of communication is needed to enable unfettered market growth, and to support the development and use of new handheld devices needed to provide increasing levels of mobile multimedia communication functionality.

Although the formation of alliances and partnerships between cellular service providers and landline service providers may help to ward off competition, such alliances and partnerships are faced with other problems. For example, the erection of cellular infrastructure such as cellular towers may be an expensive venture since this may require acquisition of real estate, whether in the form of outright purchases or through leasing. Cellular infrastructure also requires the establishment of one or more expensive backbone links to handle core network traffic. Another cellular-related problem is that the cellular signals do not penetrate and propagate in buildings such as homes and offices very well. This is especially true with the frequencies that are typically utilized in the United States, which may vary between 800 MHz and 1900 MHz or 1.9 GHz.

The use of digital media is growing at an extremely rapid pace. Most consumers today have a variety of devices that gather, store, process, generate, communicate, play back, and/or display information electronically, in a digital form. Examples of such devices include digital still and video cameras, personal digital assistants (PDAs), laptop and desktop personal computer (PC) systems, video cassette recorders (VCRs), personal video recorders (PVRs), document and photo scanners, digital and high definition television sets, stereo audio equipment, and mobile multimedia handsets, to name only a few. A majority of these devices produce and/or store digital information related to the people and interactions that are a part of the life of the owner. Additional information is also available from sources other than those belonging to the consumer such as, for example, the Internet.

Present day caller identification (caller ID) features available with both wired and wireless (i.e., cellular) telephone service present at least the directory number with the incoming call. Although the caller ID service of wireline carriers may provide both the name and the directory number of the caller, wireless carriers typically provide only the directory number of the origin of the incoming call. If the name is provided, or if the recipient recognizes the calling number, the recipient can make an informed decision whether to accept the call, and may be able to have an idea of the reason for or subject of the call. In cases where only the directory number is provided, if the recipient does not recognize the calling number, the value of caller ID is lost.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method for delivering enhanced caller identification information to a plurality of access devices, substantially as shown in and/or described in connection with at least one of the figures, as set forth more completely in the claims. These and other advantages, aspects, and novel features of the present invention, as well as details of illustrated embodiments, thereof, will be more fully understood from the following description and drawings.

DETAILED DESCRIPTION OF THE INVENTION

Aspects of the present invention relate to the seamless merging of wide area networks, from any kind of wired and/or wireless wide area networks, to pockets of wired and/or wireless local area networks and personal area networks, which may be located in homes or other environment such as an office or business. More specifically, aspects of the present invention relate to the delivery of enhanced caller identification (caller ID) information to an access device such as, for example, a mobile multimedia handset, personal computer, or personal digital assistant, to name only a few. The enhanced caller ID information may comprise selected multimedia information from other access devices, or from sources accessible via a broadband network. The delivery of the enhanced caller identification information may be supported by a broadband access gateway that permits broadband network access via, for example, a personal cellular microcell, a personal area network (PAN), a wired or wireless wide area network (WAN), wireless local area network (WLAN) or other type of network located within a premises such as, for example, a home, office, business, or the like. Services that may be available via such a broadband gateway connection include, for example, access to the public switched telephone network (PSTN); Internet protocol (IP) phone access; extended access to commercial cellular and PCS networks such as, for example, TDMA, CDMA, and GSM; and access to and/or control of a variety of multimedia access devices or networked resources capable of providing streams of images, still pictures, video, and audio; to name only a few. Examples of multimedia information include streaming video, broadcast video, voice, digital data, text, digitized audio, digitized still images, digitized video, and digitized music. The merging of these various types of networks may enable transparent communication of all types of media between access devices, which may be coupled in a wired or wireless fashion to one or more of these networks. In an embodiment of the present invention, access to services available through a wireless broadband gateway may be simplified, permitting their use by a wider group of users of access devices in, for example, homes, offices, and businesses.

Figure 1:
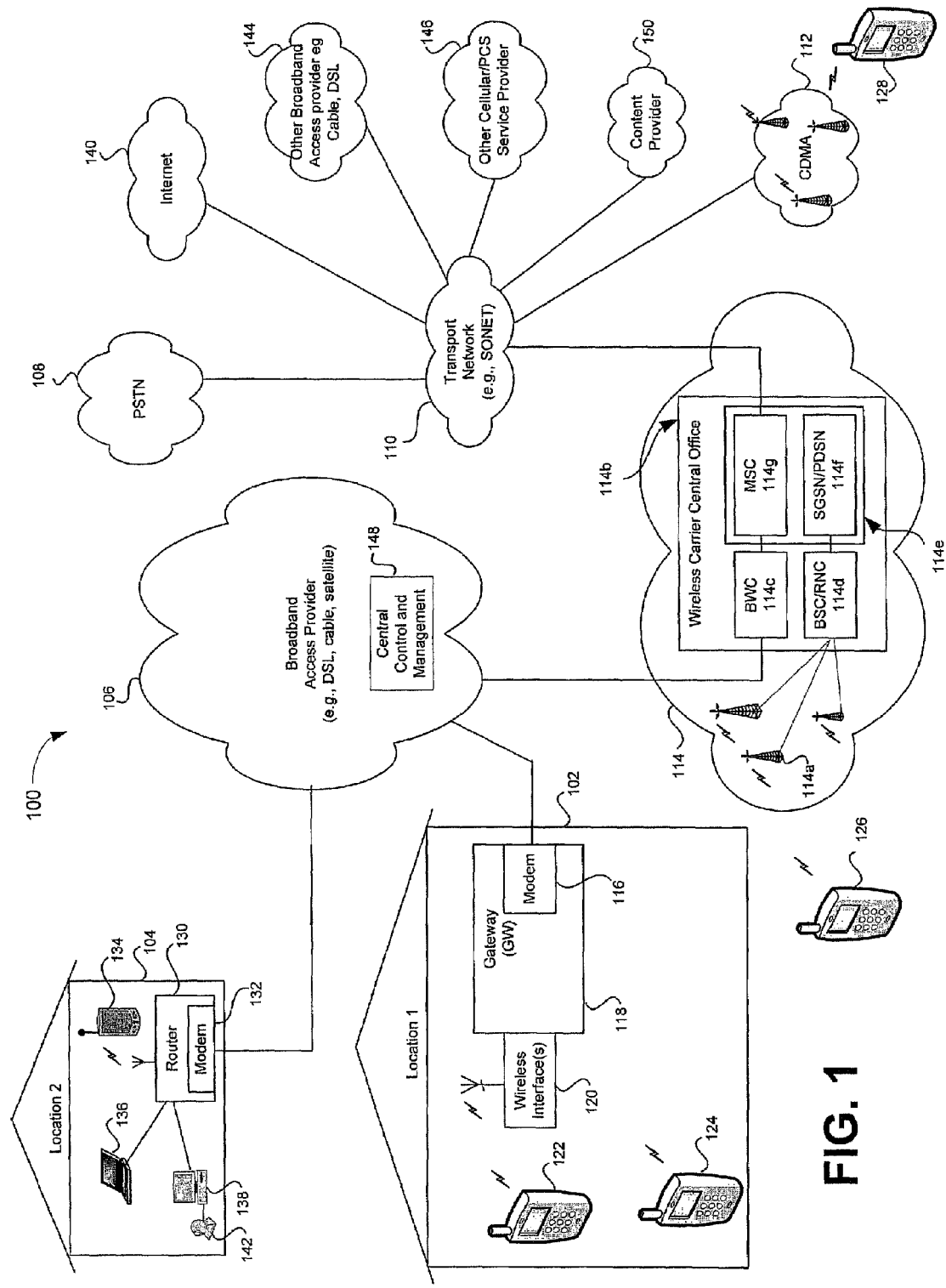
FIG. 1 is a block diagram illustrating an architecture of an exemplary communications system in which a representative embodiment of the present invention may be practiced.

FIG. 1 is a block diagram illustrating an architecture of an exemplary communications system in which a representative embodiment of the present invention may be practiced. Referring to FIG. 1, there is shown a first location 102, a second location 104, a broadband access provider (BAP) 106, public switched telephone network (PSTN) 108, a transport network 110, wireless networks including CDMA network 112 and GSM network 114, and access devices 126 and 128. The first location 102 comprises a gateway 118 having a modem 116, a wireless interface(s) block 120, and the access devices 122, 124. The access devices 122, 124, 126, 128 may comprise, for example, a mobile multimedia handset having a high level of functionality such as, for example, that of one or more of a digital video or still camera, a portable audio (MP3) player, a personal digital assistant, and a voice handset. The access devices 122, 124, 126, 128 may be capable of operating using, for example, a personal area network and/or wireless local area network compliant with, for example, Bluetooth, IEEE 802.11a/b/g/n, and/or IEEE 802.15.3a ultra-wideband standards. The second location 104 comprises a router 130 having a modem 132, and a plurality of wireless access devices. The plurality of wireless access devices at the second location 104 may comprise a personal computer (PC) 138, a laptop 136 and a wireless personal digital assistant (PDA) 134. A peripheral such as a digital camera 142 may be coupled to the personal computer 138. Other peripherals such as printers, digital scanners, speakers, and the like, which are not shown, may also be coupled to the personal computer 138 and/or laptop 136. The wireless interface block 120 may comprise a plurality of interfaces such as a Bluetooth interface, an IEEE 802.15.3a ultra-wideband interface, and any combination of an IEEE 802.11a, b, g and/or n interface.

FIG. 1 also comprises an "other broadband access provider" block 144, an "other cellular/PCS service provider" block 146, a central control and management block 148, and content provider 150. The "other broadband access provider block 144" may be, for example, a cable, DSL, or other type of broadband access provider. The central control and management block 148 may comprise suitable logic, circuitry and/or code that may be adapted to handle content delivery and security functions such as authentication, validation, key or certificate management, and authorization. The central control and management block 148 may also be adapted to handle provisioning and service management. In a representative embodiment of the present invention, the central control and management block 148 may establish communications links with, for example, the gateway 118, the broadband access provider 106, the other broadband access provider 144, the other cellular/PCS service provider 146, the CDMA network 112, and the GSM network 114 using actual or virtual connections.

The broadband access provider 106 may be, for example, a cable operator, telephone company, or satellite operator providing Internet access along with other communication services. In instances where BAP 106 is a telephone company, broadband service to locations 102, 104 may be provided via DSL or other broadband access technology. Accordingly, the modems 116, 132 may be DSL modems. In instances where BAP 106 is a cable operator, broadband service to locations 102, 104 may be provided via cable. Accordingly, the modems 116, 132 may be DOCSIS compliant or other type of cable modem. Given the rapid decrease in the cost of leased telephone lines over the past decade or more, the connection to the location 102, 104 may also be T1 or T3 connections. For example, a switch located at a central office (CO) (not shown) may be utilized to couple a T1 or T3 connection between the second location 104 and the PSTN 108.

The gateway 118 may comprise an integrated DSL modem, cable modem or other high-speed modem that may be required for handling a connection such as a T1 or T3 connection. Alternatively, the gateway 118 may be coupled to an external DSL modem, cable modem or other high-speed modem that may be capable of handling connections such as a T1 or a T3 connection. The gateway 118 may be adapted so that it has access to protocol stack information that may be related to the GSM and/or CDMA networks 114, 112, respectively. The gateway 118 may also be adapted to provide protocol support for communication with "other cellular/PCS service provider" block 146.

Each of the CDMA and GSM networks 112, 114 may comprise a plurality of cell sites (a/k/a cellular towers) that are located in geographical cells within each of the networks. Within the GSM network 114, each of the cell sites such as, for example, cell site 114a may comprise a base transceiver station (BTS), and one or more base transceiver stations (BTSs) may be coupled to wireless carrier central office 114b. The wireless carrier central office 114b may comprise a base station controller/radio network controller (BSC/RNC) such as BSC/RNC 114d. One or more base station controllers/radio network controllers (BSCs/RNCs) may be coupled to the core network 114e, that comprises a network edge switch called a mobile switching center (MSC), such as MSC 114g, and a serving GPRS support node (SGSN)/packet data serving node (PDSN) 114f, of the GSM network 114. The mobile switching center may be coupled to, for example, the PSTN 108 via the transport network 110. As an access device moves out of range of a first cell site to within range of a second cell site, the decrease signal power received from the first cell site and the increase in signal power received from the second cell site causes initiation of handoff of a call from the first cell site to the second cell site. In cases where there is no second cell site to handoff to, the call may be maintained by the first cell site power until it is attenuated to a threshold where it is no longer feasible to maintain the call. At the point where the power reaches or falls below this threshold, the call may drop and any related call resources may be relinquished. In a home and/or office environment, it may be desirable to have a second network to which the call may be handed off to.

As an illustration, a user may be on their way home and as the user approaches their home, the signal may fall below a minimum signal power threshold that is required to maintain a call. However, instead of dropping the call, the call may be handed off to, for example, a PAN or a wireless local area network (WLAN) that may be located within the user's home or an unlicensed wireless access system that may be located in the user's home. For example, with reference to FIG. 1, as access device 126 migrates from the vicinity of the serving cell site 114a in GSM network 114 towards the wireless interface 120 in the first location 102, the call may be handed off from the cell site 114a GSM network 114 to the wireless interface 120 coupled to the gateway (GW) 118 at the first location 102. Accordingly, instead of the call being dropped, the call has been seamlessly handed off and is now being handled by the gateway 118 via the wireless interface 120. The resulting wireless data may then be communicated to the GSM network 114 via the broadband connection to the BAP 106 which is connected to the broadband wireless local area network controller (BWC) 114c.

In this illustration, the user is handed off to their PAN, WLAN, or other network located within their home. However, the user could also have been handed off to another network system such as a neighbor's network. In any case, a gateway coupled to the wireless interface which is providing service to the user may communicate at least a portion of the data to, for example, the cable or DSL BAP 106, the GSM network 114, CDMA network 112, other broadband access service provider 144, other cellular/PCS service provider 146 and central control and management block 148. The user may be provided with a notification that indicates the presence of the PAN, WLAN, or other unlicensed network. For example, an icon representative of a personal area network may be displayed on the screen of the access device 126 once a soft or hard handoff is achieved from a serving cell site in GSM network 114 to the wireless interface 120 at the first location 102. A special tone or other audio alert may also be utilized to indicate that the call has switched to the wireless interface 120.

In instances where the gateway 118 detects a compatible access device that may be within the range of the wireless interface 120, the gateway 118 may immediately advertise its available services to the access device. In this regard, the gateway 118 may be adapted to transmit service advertisements to the access device in order to alert a user of the access device of the types of services that are being offered by the gateway 118. Signals containing icons representative of the services may be transmitted to and displayed on a screen of the access device and/or audio alerts may be utilized to notify the user of these services.

In another embodiment of the invention, quality of service (QoS) may also be advertised by the gateway 118. For example, when a user is being serviced by the wireless interface 120, the gateway 118 may advertise that stereo audio is available.

Access devices may be pre-registered so that when they are within the range of the wireless interface 120, the gateway 118 may automatically recognize them. For the pre-registration, an administrator of the gateway 118 at the first location 102 may register access devices that are allowed to access the gateway 118 when they are within the range of the wireless interface 120. Pre-registration may be done prior to the access device accessing the gateway 118. During pre-registration, an administrator or owner of the gateway 118 may enter registration or configuration information such as device IDs of access devices belonging to friends and/or family member's into a registration database associated with the gateway 118. As a result, these devices will be allowed to access at least a portion of the services offered by the gateway 118 whenever they attempt to access the gateway 118 by pressing a single button, for example. Opportunistic registration permits a user of an access device to register with the gateway 118 automatically with little or no effort on the part of the user. In this regard, registration information may be sent to the gateway 118 from an access device during an initial access and the gateway 118 may chose to accept or deny the registration. The registration information may be automatically or manually sent to the gateway 118.

In certain instances, an access device may not have been pre-registered to access the network. In this case, one button access may be provided. A single button such as a hard coded button or software-enabled button on an access device may be programmed to transmit identifying information from the access device to the gateway 118. The gateway 118 may utilize this transmitted identifying information to grant or deny access to its services. For example, one button may be programmed to contain access device identifying information related to accessing the services provided by gateway 118 at the first location 102. The gateway 118 may also be adapted to utilize digital certificates to authenticate access devices.

An interactive process may also be provided, whereby the gateway 118 may prompt or request particular information, for example a password from an access device requiring network access. If the particular information is received, then access to at least some of the services provided by the gateway 118 may be granted and if not, the access to at least some of the gateway's services may be denied.

In another embodiment of the invention, the one button access may be provided via software-enabled button (soft button) or hardware-enabled button (hard button). In this regard, the software button may be displayed on a screen of an access device. A "walled garden" approach may be utilized to provide access to the services that may be offered by a particular gateway, for example, gateway 118. Under the walled garden approach, when an access device first registers or is identified, a basic set of services may be provided by the serving gateway 118 to the access device 124. The basic services offered may vary among each gateway. At least some of the basic services that are provided by a gateway such as gateway 118, may be offered without authenticating the access device 124. However, other services may only be offered if an access device such as access device 124 is properly authenticated. These services that are offered may be services that were advertised by the gateway 118.

In an aspect of the invention, access to additional services may be granted based on, for example, user identity, access device identity and or user input. The services offered to an access device by a gateway may be arranged in a hierarchical structure such as a tier. For example, in a first tier, a user may be prompted to enter membership information such as a member identification number. Upon authentication of the membership identification number, the first tier may provide restricted access with pop-up advertisements that may not be disabled. In a second tier, for example, a user may be prompted to enter a password. Upon authentication of the password, second tier information may provide restricted access to gateway services without pop-up advertisements. In a third tier, for example, entering billing information such as an account number or credit card or check card number may provide unlimited and/or unrestricted access to all the services offered by a gateway. A fourth tier may provide only operating instruction and information for guests.

An administrator of the gateway may establish the type of access provided by the walled garden. For example, if the first location 102 is a hotspot at a Café, the provider of the gateway may establish the service access levels or tiers that may be provided by the gateway 118.

When an access device is within the range of the gateway 118, wireless service is handed off from a serving cell site 114a in the GSM network 114 to the gateway 118. The access device may be authenticated by the gateway 118 and permitted to access at least some of the services offered by the gateway 118. Once the access device is authenticated, at least a portion of the information on the access device may be made available as a networked resource via the gateway 118. A user of the access device may chose whether information on the access device may be made available to the gateway and if so, that information which will be made available, and that information which will be unavailable to the gateway 118. In this regard, where information is made available, the gateway 118 may maintain a list of the resources that may be available on access devices that may be coupled to the gateway 118. For example, a list of contact information, calendar information, audio files, video file and/or data files stored on the access device may be sent to the gateway 118.

The resources that are available on the access device may also be advertised to other access devices that may be in communication with the gateway 118. Advertisement of the resources that may be available on an access device may be restricted to, for example, a list of particular devices, a particular type of devices or to a particular user. Accordingly, a user may have to be properly authenticated prior to certain information being made available to the user. Additionally, advertisement of the resources may cause certain icons representative of the resources to be displayed on other access devices. In a similar manner, icons representative of the resources that may be available on these other access devices may also be presented on the access device.

An access device may be provided with a welcoming screen that may allow a user of a device to sign up for either free or paid services. Once the signup is complete, subsequent access by the user may be authenticated by the gateway 118 utilizing the signup information. Whenever an access device registers with and/or is authenticated by the gateway 118, information on the access device may be updated and/or synchronized with information that may be on the gateway 118.

Devices within the location of the gateway 118 may be configured to register certain portions of their data content with the gateway 118 through a gateway registration process. Once data for these devices is registered to the gateway 118, the gateway may maintain a database, which keeps track of the data that is available, and its location. Accordingly, if the data previously stored in the database is no longer available, then information representative of the previously stored data may be removed from the database. Data from devices coupled to the gateway 118 such as on laptops, CD players, digital video disk (DVD) players, TIVO, personal video recorders (PVRs), personal digital assistants (PDAs) and other devices, may be registered with the gateway 118. This data may comprise audio, video, still pictures, and/or text.

At least a portion of the registered data may be made available to other network access devices via the gateway 118. In an aspect of the invention, the gateway 118 may be adapted to maintain a searchable list of data that may be available via the gateway. In this regard, the gateway may comprise a search engine that may be utilized to locate and distribute data that may be made available through the gateway 118. In another aspect of the invention, data may be made available to access devices via advertising by the gateway 118. Access devices may be configured to seek out particular data that may be of interest. Accordingly, an access device may be adapted to receive and process only those gateway advertisements may fit particular criteria. Those advertisements that may not fit the particular criteria may be discarded or ignored.

When an access device is within the range of the gateway 118, wireless service may be handed off from a serving cell site 114a in the GSM network 114 to the gateway 118. The access device may be authenticated by the gateway 118 and permitted to access at least some of the services offered by the gateway 118. Once the access device is authenticated, a user of the access device may have a desire to locate a particular video presentation. The user may access the search engine, which may have been advertised to the user's access device by the gateway 118. The search engine may appear on the display of the user's access device as an icon. The user may then activate a search by selecting the search engine icon, inputting a name of the video presentation and executing the search.

In another embodiment of the invention, the gateway may be adapted to classify information based on a given criterion. This classification may assist with locating information based on a particular criterion. In this regard, a user of the access device may be presented with a list of classifications and may select one, which may be of interest based on a particular criterion. This may narrow the focus of a search.

The gateway may also be utilized to facilitate seamless synchronization of data between devices that may be wired or wirelessly coupled to the gateway 118. For example, audio files located in a music folder on a PC coupled to the gateway 118 may be synchronized with a wireless media player coupled to a hot spot in an airport while a user of the wireless access media player waits to board a flight. In this regard, the gateway may determine what files need to be synchronized and control how the synchronization is accomplished. The same is true for files that may be downloaded from the PC to the wireless access media player, and for files that may be uploaded from the wireless access media player to the PC. Calendar and/or contact information may also be updated and/or synchronized with a mobile multimedia handset in a similar manner utilizing the gateway 118.

A location-aware service determines an approximate location of a network device and adapts delivery of a particular service application and/or content according to a quality of service criterion. The delivery of location-aware services may be controlled by the gateway 118. For example, a user of an access device may request playback of an audio clip via the gateway 118. After receiving the request for playback of the audio clip, the gateway 118 may determine that a channel between the gateway 118 and the user's access device may only be capable of maintaining a reduced playback rate. As a result, instead of sending 128 kbps encoded audio data, then the gateway may send 96 kbps data. Hence, in a case where the audio data was originally stored in 128 kbps sampled audio data, then the gateway 118 may transcode the 128 kbps sampled data to 96 kbps audio data.

In another illustrative embodiment of the invention, while the GSM network 114 is servicing the access device, lower compression rates may be utilized to provide service to the access device. However, when the access device roams within range of the wireless interface 120 and is being served by the gateway 118 through wireless interface 120, higher compression rates may be utilized. For example, audio data sampled at a data rate of 64 kbps may be utilized for playback on an MP3 enabled telephone while the phone is being serviced by a cell site 114a in the GSM network 114. However, once the MP3 enabled telephone is within the operating range of the wireless interface 120 and is being serviced by the gateway 118, the gateway 118 may automatically adapt to a higher data rate of, for example, 92 kbps or 128 kbps.

Automatic format conversion by the gateway 118 may include converting data from a first format to at least a second format suitable for delivery and/or display on an access device. This may permit data that would otherwise be incompatible with a first access device to be played on that first access device. For the location-aware services based on QoS, data was converted from a first format 128 kbps to a second format 96 kbps to achieve and/or maintain a particular QoS, but the data type remained the same. In this case, the audio format and/or its data type may be different. For example, if the audio format was MP3, then after the conversion, the format remained WAV and/or the sampling rate may have decreased from 128 kbps top 96 kbps.

In conventional wired caller ID systems, a name and/or directory number (DN) of a calling party may be transferred either in-band or out-of-band to a called party and may be displayed on the called party's caller ID display when a call is answered. In these conventional systems, the caller ID information is limited to a callers name, directory number (DN), general location and/or time of call. In wireless telephone systems, in order to save on bandwidth, only a caller's directory number is transferred and displayed to a calling party. However, if the calling party's directory number and name is stored in the called party's phone, then the stored name and stored directory number will be presented on a display of the called party's terminal. In this case, the stored directory number is compared with the transferred caller's directory number, and if a match occurs, then a name corresponding to the matching directory number is also displayed on the called party's terminal.

In accordance with an embodiment of the invention, the gateway 118 is adapted to determine the appropriate caller ID information that may be displayed in a called and/or calling party's caller ID. In this case, reverse caller ID information may be displayed on both a calling and a called party's terminal by the gateway 118.

If a called and/or calling device is a mobile multimedia handset and/or laptop, for example, contact or other personal information may be displayed the caller's and/or calling party's directory number. The level or amount of information that may be displayed may be varied. Certain sensitive information relating to either the called or calling party may be restricted from being displayed.

In current cellular communication systems, over the air (OTA) programming is utilized to program a cellular telephone during the provisioning process. In some instances, cellular providers have established websites that may be utilized or OTA programming. In this regard, a cellular subscriber may access the website and enter information such as the assigned directory number and the electronic serial number of the cellular telephone being programmed.

In accordance with a representative embodiment of the invention, an access device may be registered using over the air programming via the gateway 118. A user of an access device may send access device information to the gateway 118 using, for example, a default interface that may be presented to and displayed on a screen of the access device when the access device first enters the service area of the wireless interface 120. During registration, the capabilities of an access device may be sent to the gateway 118 and may be shared with devices that may be coupled to the gateway 118.

Since the gateway acts as a registrar of information for all the access devices that may be wired or wirelessly coupled to it, the gateway may function as a personal digital assistant for any of these access devices. In an illustrative example, a first device, a first PC and a second PC are being serviced by the gateway 118. The first access device receives a call and the caller ID information shows the caller's name, home directory number and home address. However, the first PC contains the business address for the caller and the second PC contains the monthly calendar information for the caller. Assume that the caller had a desire to setup a business meeting. In accordance with an aspect of the invention, the gateway 118 may be adapted to provide the business address of the caller to the first access device and also provide the caller's calendar to the first access device. In this manner, the network centrally provides all the information necessary for scheduling the meeting. In this example, the first PC may belong to the user of the first access device and the second PC may belong to the caller.

This concept may be extended to a look-up or 411 directory assistance on the Internet. The lookup may also be location dependent. In this regard, if a user is located in Hollywood and requests a hotel location, the gateway 118 may only cause the hotels that are located in Hollywood to be displayed to the user.

The gateway 118 may also be adapted to create profile information based on data usage. These created profiles may be utilized to create social networks for people having common interests. Accordingly, users may be permitted to post their interests and also select those people having similar interests based on the created profile. Based on the created profile information and the posted user interests, the gateway 118 may also generate a list of those people who have similar interest and also those users that may potentially have similar interests.

Given the capability to seamlessly operate an access device as one migrates from outside the home into the home, it is desirable to have a single device that may be adapted to control at least some of the devices that may be found within the home. In addition to its normal voice or data communication operating mode, an access device may be configured to operate as a universal remote that may be utilized to remotely control a plurality or other devices such as a TV, DVD, CD, Stereo, display monitor, or a combination thereof. Most access devices currently have an IR transmitter, which may be adapted to communicate with other IR receiver devices.

The access device may be used for wireless communication and for remotely controlling an electronic device with as a TV, CD/DVD recorder/player, or other device. The access device may also include at least one soft-button that may be enabled through the gateway 118 and may be utilized to control any other device that may be coupled to the gateway 118.

The gateway 118 is adapted to virtually aggregate data that may be visible from a plurality of access devices or other network devices. Although the gateway 118 may be adapted to store some service and content related information, the gateway 118 does not actually store copies of data that resides the access devices and/or other network devices that may be wired or wirelessly coupled to it. However, the gateway 118 may store, for example, metadata information that may be utilized to locate and access the information stored on the access devices and/or other network devices. The gateway is therefore adapted to function as a registrar of both service and content related information.

Whenever an access device registers with and/or is authenticated by the gateway 118, information may be collected from the access device and related metadata information may be updated and/or synchronized with information that may be currently stored on the gateway 118. Additionally, when a device is no longer being serviced by the gateway 118, associated information may be released from the gateway 118. In this regard, the virtual aggregations function performed by the gateway 118 guarantees that the most current information is accessible from the access devices.

Figure 2:
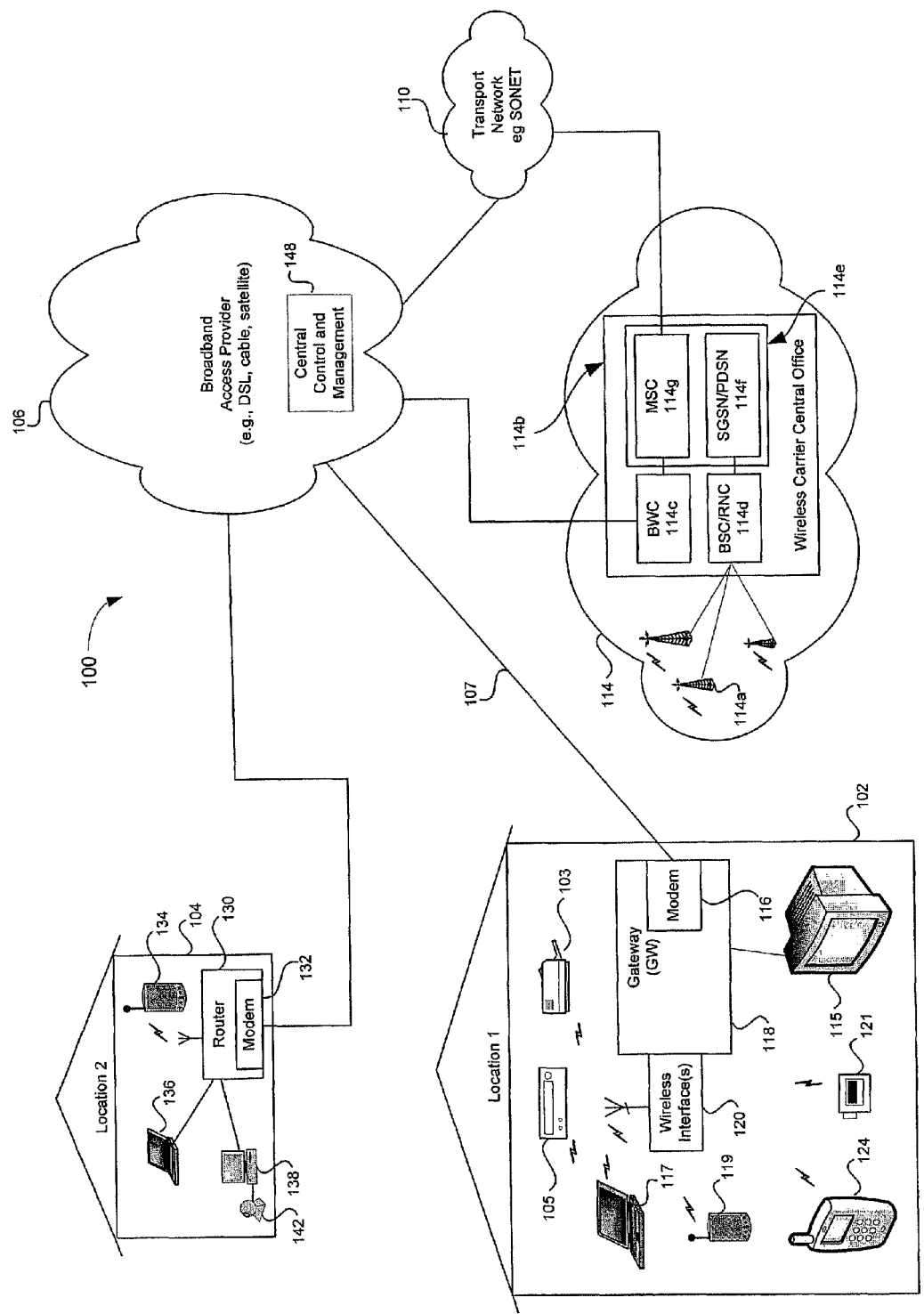
FIG. 2 shows a block diagram illustrating an exemplary communication system, in accordance with a representative embodiment of the present invention.

FIG. 2 shows a block diagram illustrating an exemplary communication system 100, in accordance with a representative embodiment of the present invention. The communication system 100 shown in FIG. 2 comprises a wireless interface 120, a gateway (GW) 118 with a modem 116, and an array of access devices such as, for example, a printer 103, a stereo receiver 105, a laptop 117, a wireless personal digital assistant (PDA) 119, and a digital video camera 121, at location 102. The communication system 100 of FIG. 2 also comprises an access device 124 that may correspond, for example, to the access devices 122, 124, 126 of FIG. 1. A second location 104 within communication system 100 comprises a router 130 with a modem 132, and a plurality of wireless access devices. The plurality of access devices at the second location 104 may, for example, comprise a personal computer (PC) 138, a laptop 136, and a wireless personal digital assistant (PDA) 134. A peripheral such as, for example, a digital camera 142 may be coupled to the personal computer 138. Other peripherals such as, for example, printers, digital scanners, speakers, and the like, that are not shown in FIG. 2, may also be coupled to the personal computer 138 and/or laptop 136. The wireless interface 120 may comprise a plurality of interfaces such as, for example, a Bluetooth interface, a cellular interface, and any combination of an IEEE 802.11a, b, g, and/or n interface, and/or an IEEE 802.15.3a ultra-wideband interface. Although the following discussion refers frequently to the capabilities and actions of the gateway 118 and wireless interface 120, the same may be said of the router 130 with the modem 132 of FIGS. 1 and 2, for example, without departing from the spirit and scope of the present invention.

In accordance with a representative embodiment of the present invention, a wireless access device such as access device 124 may be mobile, and may move between the personal area network/wireless local area network coverage provided by wireless interface 120 at location 102, the wide area network coverage provided by, for example, GSM network 114, and the coverage provided by the router 130 and modem 132 at location 104. The location 102 may, for example, be the home of the user of the access device 124, the home of a friend or relative of the user of access device 124, or an office, business, etc., where the user of access device 124 may travel. The location 104 may, for example, be a second home of the user of access device 124, the home of a friend or relative, an office, or may have no personal or business relationship with the user of access device 124. In a representative embodiment of the present invention, the gateway 118 may comprise, for example, a set top box that may be coupled in a wireless or wired fashion to access devices such as, for example, a laptop computer or television, such as the laptop 117 and the television 115 of FIG. 2. Access to the communication bandwidth of a broadband network as previously described may be provided by the gateway 118 and the modem 116 to wired or wireless access devices in the vicinity of location 102, and via router 130 and modem 132 to wired or wireless access devices in the vicinity of location 104, as shown in FIG. 2. This architecture may provide extended access to wireless networks such as, for example, the GSM network 114, CDMA network 112, other cellular/PCS service provider 146, Internet 140 and public switched telephone network 108, of FIG. 1. The modem 116 is shown connected to a broadband access provider (BAP) 106 via a broadband connection 107. The broadband connection 107 may comprise, for example, a digital subscriber line (DSL) connection, a cable network connection, a satellite connection, a T1 or T3 network connection, or similar broadband communication link. The modem 116 is compatible with the broadband connection 107, and may be, for example, a DSL modem, a DOCSIS-compliant cable modem, a satellite service modem, or T1 or T3 compatible modem-type device. The broadband connection may provide access through BAP 106 to location 104, and via transport network 110 to, for example, GSM network 114.

In the example illustration of FIG. 2, a user of the access device 124 may or may not be engaged in communication with another system or subscriber accessible via the GSM network 114, or other wide area network of FIG. 1. Although the present example of FIG. 2 shows a GSM network 114, a representative embodiment of the present invention may be employed with respect to other wide area networks such as, for example, the CDMA network 112 and other cellular/PCS service provider 146, shown in FIG. 1.

When an access device such as, for example, the access device 124 of FIG. 2 moves into the coverage area of a personal area network of, for example, the wireless interface 120 and gateway 118, or the router 130, the access device 124 may be authenticated by the gateway 118 or router 130. The authentication may involve the sharing or exchange of identification and/or authentication information by the access device 124 with the gateway 118 or router 130. Details of an example of such an interaction are provided in U.S. patent application Ser. No. 11/039,020, entitled "Method And System For Providing Registration, Authentication, And Access Via A Broadband Access Gateway", filed Jan. 18, 2005, the complete subject matter of which is hereby incorporated herein by reference, in its entirety. Once the access device 124 has been authenticated to the gateway 118, the access device 124 may be permitted to exchange multimedia information and services available via the access devices in communication with the gateway 118, or via networks connected to the gateway 118. Information about the available multimedia information and services may be shared by and/or with the access device 124 via information exchanged by the access device 124 and the gateway 118 or router 130. Additional information about the advertising of such information may be found in U.S. patent application Ser. No. 11/021,294, entitled "Method And System For Extended Network Access Services Advertising Via A Broadband Access Gateway," filed Dec. 23, 2004, the complete subject matter of which is hereby incorporated herein by reference, in its entirety. In a representative embodiment of the present invention, a broadband access gateway such as, for example, the gateway 118 or the router 130 of FIG. 2 may maintain a database of the information about the available multimedia information and services, described above. Details of an example of such a database of information about access device data may be found in U.S. patent application Ser. No. 11/095,842, entitled "Registering Access Device Multimedia Content Via A Broadband Access Gateway," filed Mar. 30, 2005, the complete subject matter of which is hereby incorporated herein by reference, in its entirety.

In a representative embodiment in accordance with the present invention, the user of an access device such as, for example, the access device 124, wireless PDA 119, and laptop 117 of FIG. 2 may receive a call via a wireless network such as, for example, the GSM network 114 or a broadband network such as, for example, the broadband connection 107. The incoming call may be received, for example, when the access device is not currently engaged in a call, or it may be received during a previously established call. Information identifying the calling party, generally referred to as "caller ID" information, may be included in the messaging that notifies the access device 124 of the incoming call, or the caller ID information may be sent in separate messaging. Although in this example the call is received via the GSM network 114, it should be noted that the telephone call and the associated caller ID information may be received by an access device in communication with any of the networks of FIG. 1 such as, for example, the Internet 140, the CDMA network 112, the PSTN 108, and the other cellular/PCS service provider 146, without departing from the spirit and scope of the present invention. In a representative embodiment of the present invention, the call may originate from within, for example, the GSM network 114, or any of the networks that are accessible via the network serving the called party. This includes communication networks such as, for example, the PSTN 108, the CDMA network 112, and the Internet 140 shown in FIG. 1.

In various representative embodiments of the present invention, the caller ID information received by the access device 124 may comprise the directory number of the calling party, the name of the calling party, both the directory number and the name of the calling party, or some other form of calling party identification. Although the present discussion focuses primarily on the development of enhanced caller ID information from a directory number, a representative embodiment of the present invention is equally applicable to providing enhanced caller ID information for other forms of calling party identification including, for example, electronic serial numbers, Internet protocol (IP) addresses, media access control (MAC) addresses, International Mobile Station Identifier (IMSI) addresses, and Mobile Identification Number (MIN) addresses, to name only a few.

Figure 3:
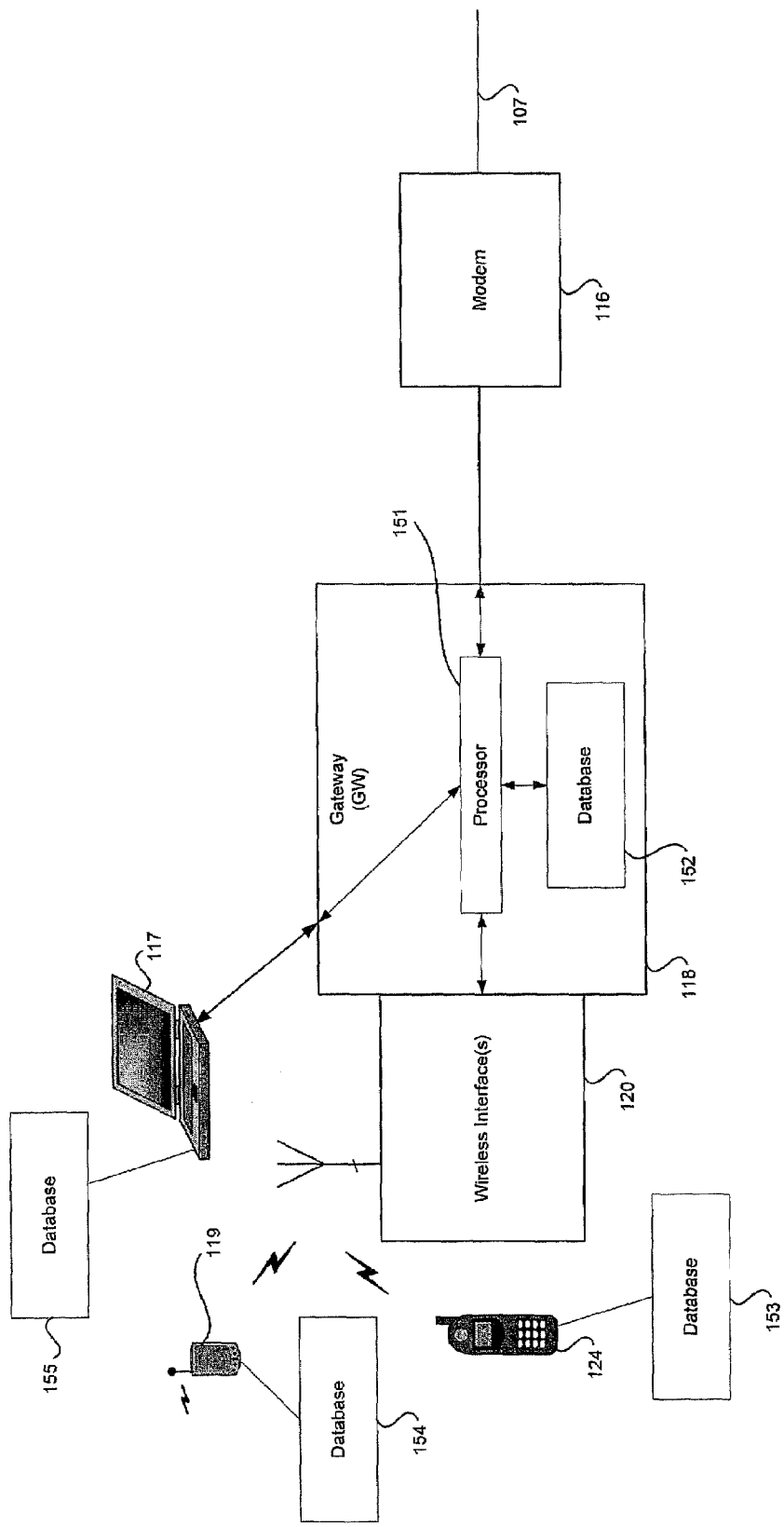
FIG. 3 shows a block diagram illustrating greater detail of a communication system that may correspond, for example, to a portion of the communication system of FIG. 2 that supports enhanced caller ID information, in accordance with a representative embodiment of the present invention.

FIG. 3 shows a block diagram illustrating greater detail of a communication system 300 that may correspond, for example, to a portion of the communication system 100 of FIG. 2 that supports enhanced caller ID information, in accordance with a representative embodiment of the present invention. The communication system 300 of FIG. 3 comprises a gateway 118 communicatively coupled to a wireless interface 120, a modem 116, and a laptop 117. The wireless interface 120, the modem 116, and the laptop 117 may correspond, for example, to the wireless interface 120, the modem 116, and the laptop 117 of FIG. 2. The modem 116 provides the gateway 118 with access to a broadband connection 107 that may, for example, comprise a digital subscriber line (DSL) connection, a cable network connection, a satellite connection, a T1 or T3 network connection, or similar broadband communication link. As shown in FIG. 3, the wireless interface 120 is communicatively coupled to access device 124 that may correspond, for example, to the access device 124 of FIG. 2. The wireless interface 120 may comprise any combination of interfaces such as, for example, a Bluetooth interface, and IEEE 802.11a, b, g and/or n interface, and/or an IEEE 802.15.3a ultra-wideband interface.

As shown in the illustration of FIG. 3, the gateway 118 may comprise a processor 151 that is communicatively coupled to the wireless interface 120, the modem 116, and the laptop 117. In a representative embodiment according to the present invention, the processor 151 may be capable of accessing a database 152 that contains a collection of information about the various multimedia information sources accessible to the gateway 118. The information resident in the database 152 of gateway 118 may be collected, for example, either at start of communication of an access device with the gateway 118, or periodically during the period while an access device is in communication with the gateway 118.

In other representative embodiments of the present invention, an access device such as, for example, the access device 124 may comprise a database that contains a collection of information about various multimedia information sources that may be used to provide enhanced caller ID information. Such a database is shown in the illustration of FIG. 3 as database 153, accessible to the access device 124. The wireless PDA 119 and laptop 117 may also comprise similar databases 154, 155, respectively, that may be used to identify sources of multimedia information that may be used in the provision of enhanced caller ID information to a user. In addition, a representative embodiment of the present invention may employ databases located on network entities accessible by the gateway 118 of FIGS. 2 and 3, and the router 130 of FIG. 2 such as, for example, a server accessible via a broadband network such as the content provider 150 of FIG. 1, for example. Information about such sources of multimedia information may be provided by an access device to the gateway 118 when the access device first comes into communication with the gateway 118, or at any point thereafter. In one representative embodiment of the present invention, the gateway 118 may use such information to identify multimedia information associated with caller ID information. In another representative embodiment, the access device 124 may use the database 153 to identify multimedia information associated with caller ID information, and may provide identified information to the user of the access device 124, or to the gateway 118.

In one representative embodiment of the present invention, an access device such as, for example, the access device 124 of FIG. 3 may forward received caller ID information to a broadband access gateway such as, for example, the gateway 118, using the personal area network and/or wireless wide area network supported by the wireless interface 120, described above. Upon receiving the caller ID information, the gateway 118 may use the received caller ID information to perform a search of a database such as, for example, the database 152, to identify potential sources of multimedia information that may be related to or associated with the received caller ID information. The multimedia information in such sources may comprise various combinations of, for example, streaming video, broadcast video, voice, digital data, text, digitized audio, digitized still images, digitized video, and digitized music. The gateway 118 may then retrieve from those potential sources multimedia information associated with database items or fields matching the received caller ID information. In a representative embodiment of the present invention, a match for the received caller ID information may exist, for example, within the multimedia information, or in metadata that describes the multimedia information. Once matching multimedia information has been identified, the gateway 118 may provide to the access device of the called party a selected set of the identified multimedia information. Delivery of the selected information may employ either a wireless interface such as, for example, the wireless interface 120 of FIG. 3, or a broadband network such as, for example, the broadband connection 107 of FIG. 3. In a representative embodiment of the present invention, the information identifying a called/calling party and the selected information associated with the called/calling party may be exchanged via either the personal area and/or wireless wide area network, or via the broadband network, described above, permitting users of access devices to receive the benefits of enhanced caller ID whether in the personal area network/ wireless wide area network coverage area of the wireless interface 120, or the wide area network served by, for example, the CDMA network 114.

In a representative embodiment of the present invention, the entries in the databases 152, 153. 154 may refer to multimedia information sources specifically identified by the user of the access device 124 receiving the caller ID information. For example, the entries may comprise information identifying a local or remote source of multimedia information such as an IP address, a universal resource locator (URL), an access device identifier, a file path or filename, and a file type, to name only a few possibilities. A user of an access device such as, for example, the access device 124 may identify to a broadband access gateway such as, for example, the gateway 118 those data sources to be used during the preparation of enhanced caller ID information. In a representative embodiment of the present invention, a list of the identified sources may be stored in the gateway 118 and associated with the user or with an access device. In another representative embodiment, the list may be stored in the access device and provided to the gateway 118 at or following commencement of communication between the access device and the gateway 118. In yet another representative embodiment, the list may be communicated along with the numeric caller ID information, at the time that the call is received.

In another representative embodiment of the present invention, the entries in the databases 152, 153, 154 may refer to multimedia information sources that have been automatically identified by the gateway 118 using predefined criteria. For example, a portion of a name or an associated type of an information source may be defined as an indicator that the information source is likely to contain multimedia information items associated with directory numbers, or with another form of caller identification. The majority of software applications store data in files having specifically assigned file types or file extensions, or having specific keywords or indicator values stored as metadata associated with the file. Files having file types or extensions associated with programs for managing personal or business telephone directories or contact lists, and files having metadata that is accessible for searching may, for example, represent valuable sources of additional information related to a caller. A data file associated with a contact manager application, for instance, may store professional and/or personal information for an individual, in addition to the directory number of the person. A broadband access gateway in a representative embodiment of the present invention may seek out and search information sources such as these that may be expected to contain information comprising a directory number or other form of caller identification. Identified items in such information sources may then be forwarded to the access device of the called party, to enable the called party to have additional details about the calling party at their disposal.

In yet another representative embodiment of the present invention, the entries in a database such as, for example, the databases 152, 153, 154 may refer to multimedia information sources that have been automatically identified by the gateway 118 using a set of heuristics. A broadband access gateway such as, for example, the gateway 118 may search through all accessible multimedia information sources, including those of access devices accessible via the personal area network supported by the wireless interface 120, and those accessible through wired connections such as, for example, the laptop 117 and the broadband connection 107. Searches of the contents of accessible multimedia information sources may, for example, be performed directly by the gateway 118, or they may be performed by search capabilities that are accessible to, and return search results to the gateway 118. The results of the search may be presented to a user of the access device 124, and the user may designate whether the items relate to the identified caller. This approach may permit such an embodiment of the present invention to determine which of the heuristics and search capabilities used are more or less reliable in identifying multimedia information sources containing useful, caller-related information.

In still another representative embodiment of the present invention, the entries in a database such as, for example, the databases 152, 153, 154 may contain links and/or references to multimedia information items exchanged by the user of the access device 124 during prior call(s) with another (called or calling) party. The links and/or references in the databases 152, 153, 154 may be identified as being associated with parties with whom the user of access device 124 has exchanged the referenced multimedia information. For example, the user of the access device 124 and a second party may have engaged in one or more previous call session(s), and may have exchanged multimedia information, links, or references to such information, during the call session. The access device 124, the gateway 118, and/or another network entity may observe such exchanged items and/or links, and may place entries in a database such as the databases 152, 153, 154, for example, to associate the second party with the links or references to those items that were exchanged.

Upon receiving information identifying a called/calling party (e.g., at the initiation of and/or during a subsequent call session), the user of the access device 124 may automatically be provided with an itemized list, group of icons, or other form of presentation representing the multimedia information items, links, or references that have been exchanged during prior call session(s) with the second party. For example, during a call session with a second party, a user of an access device such as, for example, the access device 124 may send a video clip, a spreadsheet, or another form of multimedia information, or a link or reference to such information, to the second party. A broadband access gateway such as the gateway 118 or the access device 124, for example, may observe such information being exchanged during the call session, and may record such an exchange in a database such as the databases 152, 153, 154, for example. At some later point in time, the user of the access device 124 may place/receive a call to/from the second party, and may be presented at that time with a list of items, a group of icons, and/or links that represent the items of multimedia information previously exchanged with the second party. In this manner, the user of the access device 124 may immediately have access to information and materials that may have been related to prior calls sessions, enabling the user of access device 124 to be better prepared to effectively communicate with the second party.

Figure 4:
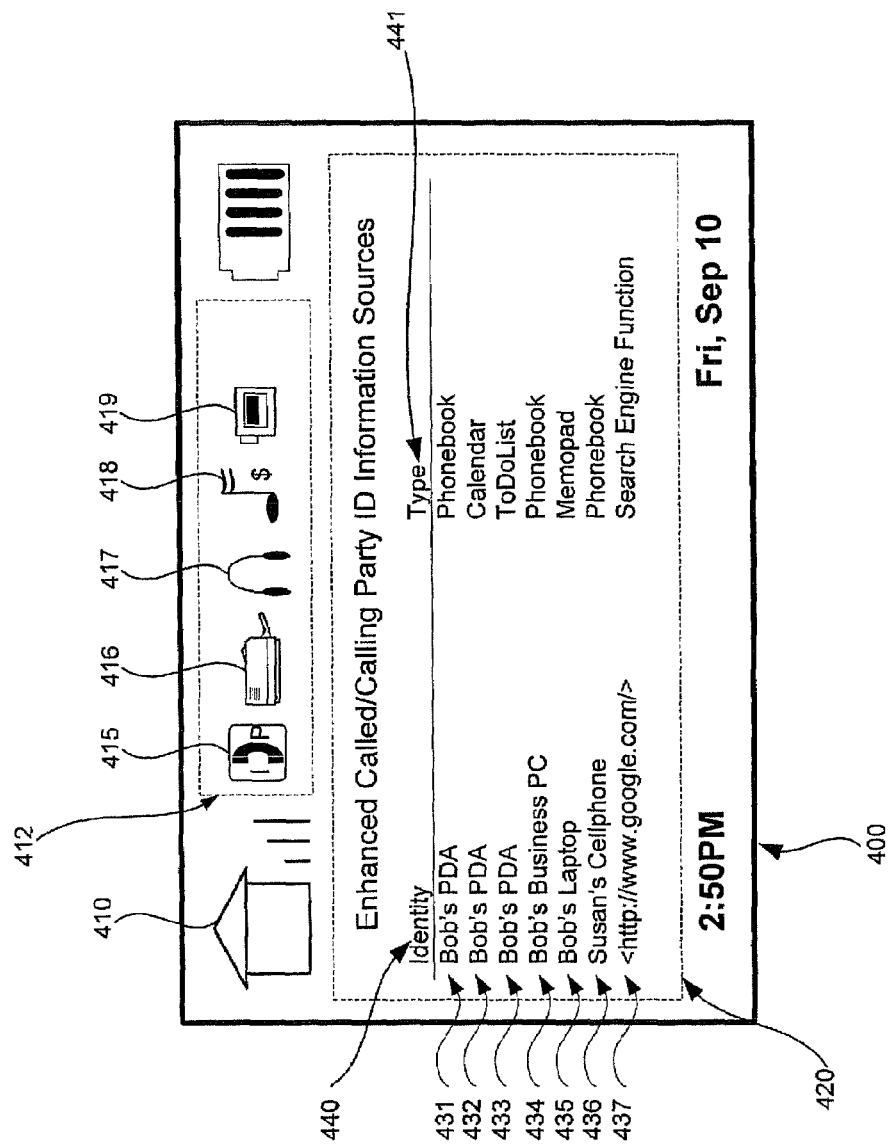
FIG. 4 illustrates a display showing an exemplary information sources screen comprising a collection of information sources accessible to an access device such as, for example, the access device of FIGS. 1, 2 and 3, that may be used in providing enhanced caller identification (ID) in accordance with a representative embodiment of the present invention.

FIG. 4 illustrates a display 400 showing an exemplary information sources screen 420 comprising a collection of information sources accessible to an access device such as, for example, the access device 124 of FIGS. 1, 2 and 3, that may be used in providing enhanced caller identification (ID) in accordance with a representative embodiment of the present invention. The display 400 of FIG. 4 comprises a network indicator 410, a network services indicator area 412, a battery life indicator, a time of day indicator, and a day and date indicator. The network services indicator area 412 of FIG. 4 comprises an Internet protocol (IP) phone service icon 415, a printer service icon 416, a stereo entertainment icon 417, a pay music service icon 418, and a video entertainment icon 419, showing those services that may be advertised by a broadband access gateway as being available to an appropriately identified or authorized user of the access device.

In the illustration of FIG. 4, the information sources screen 420 is arranged in a tabular format to show a source identity column 440 and a type column 441, listing the identity and type, respectively, of a number of information sources that may be used in providing enhanced called/calling party identification. Although the illustration of FIG. 4 shows a tabular format of text items, this particular form of presentation does not represent a limitation of the present invention, as other forms of user interface may be employed without departing from the spirit and scope of the present invention. Each of the information source entries 431, 432, 433, 434, 435, 436, 437 of the information sources screen 420 identifies an information source and an associated source type. In a representative embodiment of the present invention, a multimedia information source may comprise an access device such as, for example, the access devices 122, 124, 126, the laptop 117, the wireless PDA 119, the PC 138, the wireless PDA 134, the laptop 136, and the digital video camera 121 of FIG. 2. In a representative embodiment of the present invention, each access device in communication with a broadband access gateway such as, for example, the gateway 118 of FIG. 3 may have multimedia content useful in providing enhanced caller/calling ID information to a user. Identification of the sources and types of multimedia information present on the set of access devices in communication with a broadband access gateway such as, for example, the gateway 118 or the router 130 of FIG. 2, may be performed following the establishment of communication of the access device with the gateway 118. Identification of the sources and types of the multimedia information accessible on an access device may also occur periodically while the access device is in communication with the gateway 118.

The illustration of FIG. 4 shows in information sources entries 431, 432, 433 that "Bob's PDA" contains multimedia information of types "Phonebook", "Calendar", and "ToDoList", respectively. In addition, information source entry 434 shows that "Bob's Business PC" contains multimedia information of type "Phonebook", and information source entry 435 shows that "Bob's Laptop" contains multimedia information of type "Memopad". Information source entry 436 indicates that "Susan's Cellphone" contains multimedia information of type "Phonebook", and information source entry 437 shows that a "Search Engine Function" is available at universal resource locator (URL) "http://www.google.com". As described above with respect to FIG. 3, the multimedia information sources identified in the information sources screen 420 may be identified by a user of an access device such as, for example, the access device 124 of FIG. 3, by a broadband access gateway such as, for example, the gateway 118 of FIG. 3, or a combination of the two.

Figure 5:
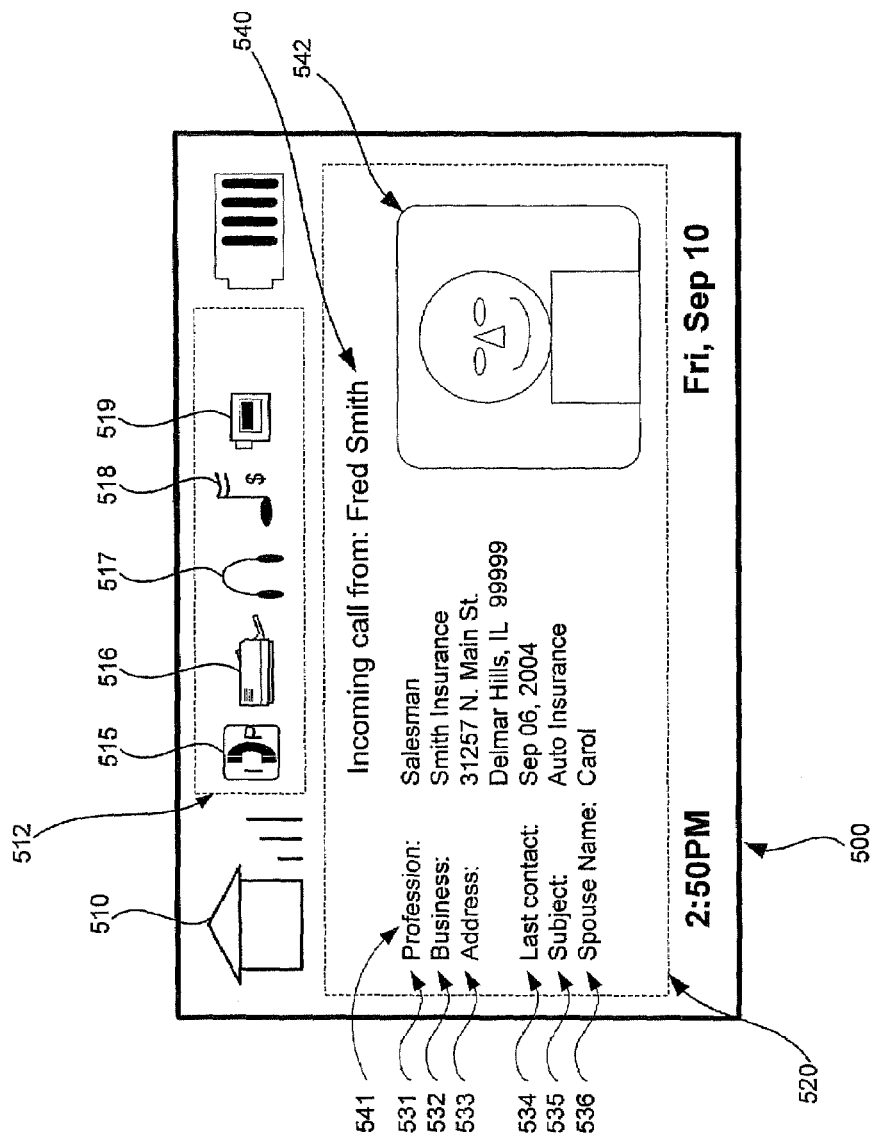
FIG. 5 illustrates a display showing an exemplary enhanced caller identification (caller ID) information screen illustrating just a few of the many information items that may be provided to the user of an access device such as, for example, the access device of FIGS. 1, 2 and 3, served by a broadband access gateway having enhanced caller identification (ID) capabilities in accordance with a representative embodiment of the present invention.

FIG. 5 illustrates a display 500 showing an exemplary enhanced caller identification (caller ID) information screen 520 illustrating just a few of the many information items that may be provided to the user of an access device such as, for example, the access device 124 of FIGS. 1, 2 and 3, served by a broadband access gateway having enhanced caller identification (ID) capabilities in accordance with a representative embodiment of the present invention. The display 500 of FIG. 5 comprises a network indicator 510, a network services indicator area 512, a battery life indicator, a time of day indicator, and a day and date indicator. The network services indicator area 512 comprises an Internet protocol (IP) phone service icon 515, a printer service icon 516, a stereo entertainment icon 517, a pay music service icon 518, and a video entertainment icon 519, showing those services that may be advertised by a broadband access gateway as being available to an appropriately identified or authorized user of the access device.

The enhanced caller identification (caller ID) information screen 520 of FIG. 5 may present additional information related to the calling party, to the user of an access device such as, for example, the access device 124 of FIG. 3. The enhanced caller ID information screen 520 comprises a caller name entry 540, a "Profession" entry 541, a "Business" entry 532, an "Address" entry 532, a "Last Contact" entry 534, a "Subject" entry 535, and a "Spouse Name" entry 536. The enhanced caller identification (caller ID) information screen 520 also comprises an image 542 of the calling party. A representative embodiment of the present invention may retrieve information such as that shown in the caller name entry 540, "Profession" entry 541, "Business" entry 532, "Address" entry 532, "Last Contact" entry 534, "Subject" entry 535, and "Spouse Name" entry 536 from one or more multimedia information sources such as, for example, the those identified in the source identity column 440 of the information sources screen 420 of FIG. 4.

In a representative embodiment of the present invention, the enhanced calling/called party identification (ID) information provided to the called/calling party may be retrieved not only from the access devices such as, for example, the access device 124, the laptop 117, and the wireless PDA 119 that are accessible to a broadband access gateway such as, for example, the gateway 118 of FIG. 3, but also from those information sources accessible to the gateway 118 via, for example, a broadband connection such as the broadband connection 107 of FIGS. 1, 2, and 3. This aspect of an embodiment of the present invention may permit identification and retrieval of multimedia information resident anywhere on a network such as, for example, the Internet 140 of FIG. 1. For example, in a representative embodiment of the present invention, the gateway 118 may retrieve a picture of the calling party, names of the callings party's family members, a home address, place of employment and professional position, church affiliation, personal interest or hobbies, the last date of contact, details of a business relationship, recent news clips about the caller, and numerous other items, from the large number of information sources outside of the set of access devices that are accessible to the gateway 118 such as, for example, those described above with regard to FIGS. 1, 2, and 3.

In an embodiment of the present invention, a broadband access gateway such as, for example, the gateway 118 of FIG. 3 may parse the identified multimedia information from an information source, to identify and associate a type with various information items. Examples of such information items include telephone directory numbers, residence and business addresses, website universal resource locators (URLs), email addresses, familial relationships (e.g., wife, husband, son, daughter, brother, etc.), and professional designations (e.g., MD, DDS, OD, Esq., and the like), to name just a few. The selection of which of the identified types are to be forwarded and displayed to the called party may be specified by the user of the access device receiving the call, and there may be a default set of types of information items that may be displayed.

Figure 6:
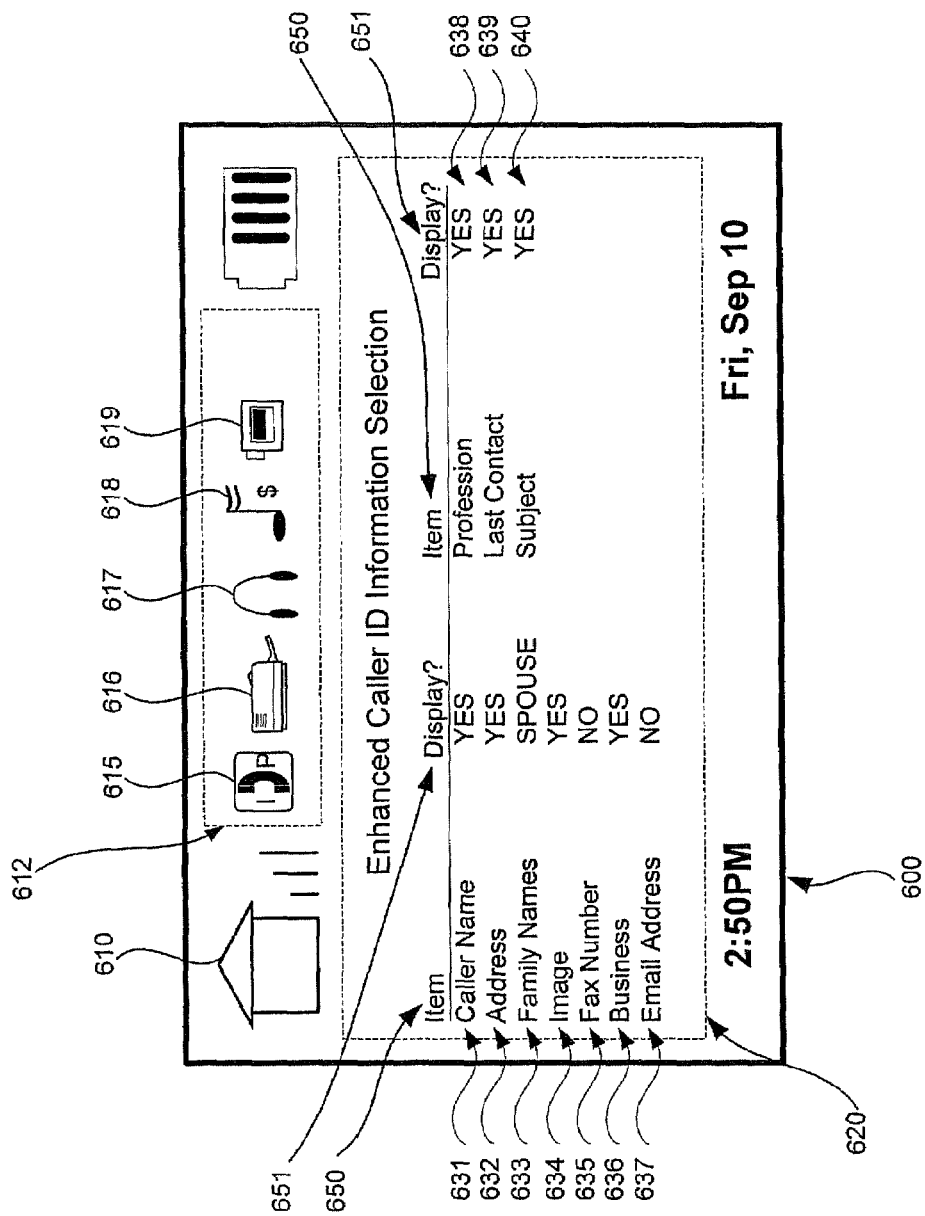
FIG. 6 illustrates an exemplary enhanced caller ID information selection screen, in accordance with a representative embodiment of the present invention.

FIG. 6 illustrates an exemplary enhanced caller ID information selection screen 620, in accordance with a representative embodiment of the present invention. The display 600 of FIG. 6 comprises a network indicator 610, a network services indicator area 612, a battery life indicator, a time of day indicator, and a day and date indicator. The network services indicator area 612 comprises an Internet protocol (IP) phone service icon 615, a printer service icon 616, a stereo entertainment icon 617, a pay music service icon 618, and a video entertainment icon 619, showing those services that may be advertised by a broadband access gateway as being available to an appropriately identified or authorized user of the access device. The display 600 of FIG. 6 also comprises an enhanced caller ID information selection screen 620 that permits a user of an access device such as, for example, the access device 124 of FIG. 3 to select the items of additional information about a caller that are to be displayed to the called party. The selected additional or enhanced caller ID information items may be displayed in a screen such as, for example, the enhanced caller identification (caller ID) information screen 520 of FIG. 5, described above.

The enhanced caller ID information selection screen 620 shown in FIG. 6 is organized in a tabular format, although other arrangements may be employed without departing from the spirit of the present invention. As shown, the enhanced caller ID information selection screen 620 comprises information item identifier column 650 and display control column 651. As shown in FIG. 6, the enhanced caller ID information selection screen 620 comprises a "Caller Name" item 631, an "Address" item 632, a "Family Names" item 633, an "Image" item 634, a "Fax Number" item 635, a "Business" item 636, an "Email Address" item 637, a "Profession" item 638, and a "Last Contact" item 639, and a "Subject" item 640. A representative embodiment of the present invention may retrieve information from a number of multimedia information sources, as described above, and may select to display only those identifiable pieces of information for which the corresponding item entry in the display column 641 of FIG. 6 is set to "YES". In FIG. 6, the items to be displayed include the "Caller Name" item 631, "Address" item 632, "Image" item 634, "Profession" item 638, "Last Contact" 639, and "Subject" item 640. The "Family Names" item 633 in FIG. 6 has been set to indicate that only the spouse name for the calling party is to be displayed. The selected items shown in FIG. 6 may correspond, for example, to the set of selected items shown in the enhanced caller identification (caller ID) information screen 520 of FIG. 5.

Figure 7:
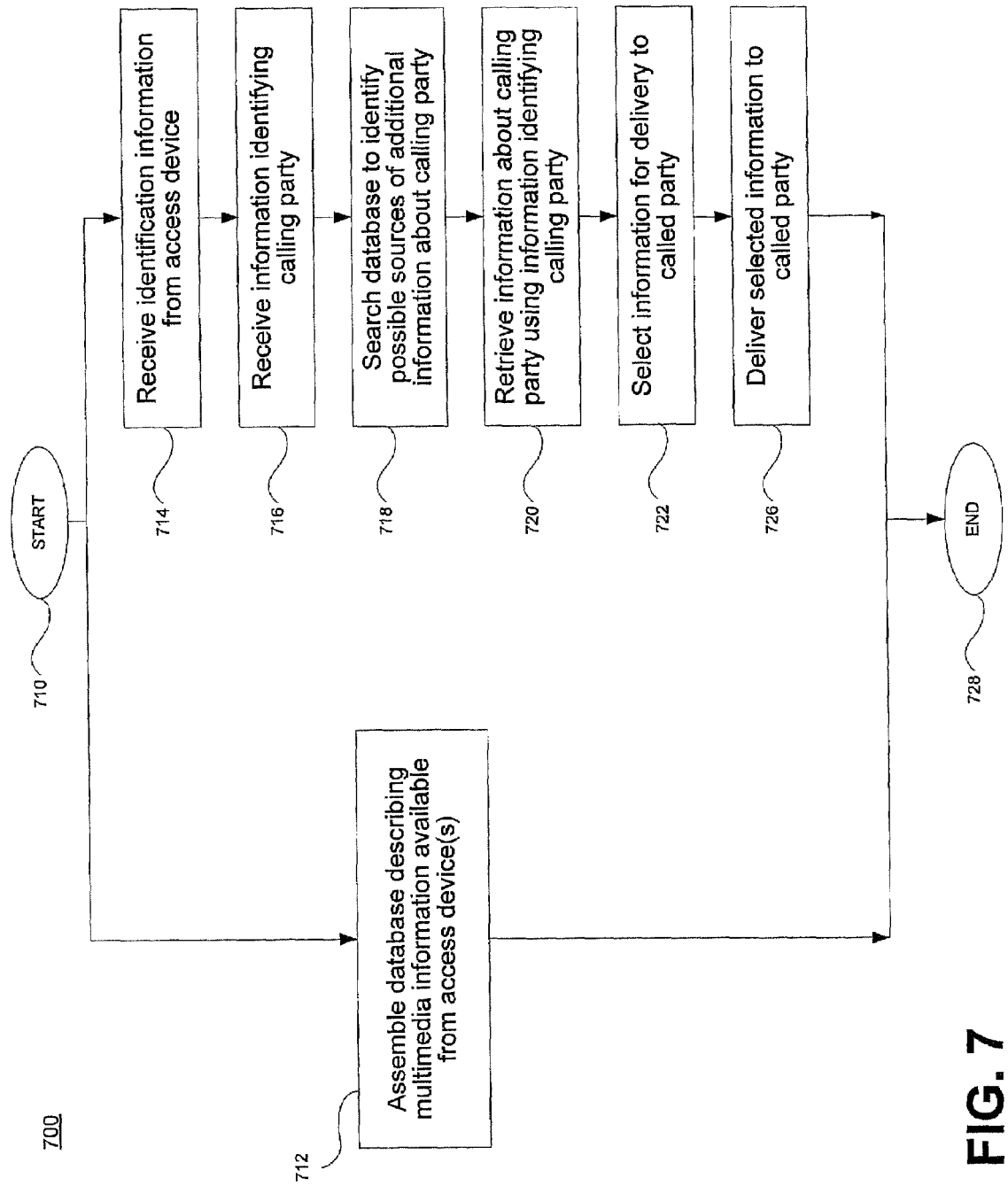
FIG. 7 shows a flowchart illustrating an exemplary method supporting the delivery of enhanced caller identification (ID) information using a broadband access gateway that may correspond, for example, to the gateway of FIG. 2, in accordance with a representative embodiment of the present invention.

In one representative embodiment of the present invention, the state or value of each of the user-defined selection items or parameters of the enhanced caller ID information selection screen 620 such as, for example, the "YES" associated with the "Caller Name" item 631, the "SPOUSE" associated with the "Family Names" item 633, and the "NO" associated with the "Fax Number" item 635 may be stored in a broadband access gateway such as, for example, the gateway 118 or the router 130 of FIG. 2. In another representative embodiment, the user-defined selection items or parameters may be stored within an access device such as, for example, the access device 124, the wireless PDA 119, and the laptop 117 of FIGS. 1, 2, and 3, and may be sent to the gateway 118 for use in selecting the enhanced calling/called party information. In yet another representative embodiment according to the present invention, the access device may employ one or more of the user-defined selection items or parameters in performing selection of enhanced calling/called party information for delivery to a user FIG. 7 shows a flowchart 700 illustrating an exemplary method supporting the delivery of enhanced caller identification (ID) information using a broadband access gateway that may correspond, for example, to the gateway 118 of FIG. 2, in accordance with a representative embodiment of the present invention. The method of FIG. 7 begins when a gateway such as, for example, the gateway 118 or router 130 of FIG. 2 is powered up (block 710). The method of FIG. 7 is arranged in two paths, to represent that the events in the left path and right path may occur concurrently. In the activity of the left path, the gateway 118 may assemble a database describing multimedia information available from any access devices in communication with the gateway 118 (block 712). Although, for reasons of clarity, this is shown as an activity that is performed once in the method, the collection and assembly of the database may be an ongoing activity. Such an activity may add to the database when an access device enters into communication with a broadband access gateway such as, for example, the gateway 118, remove information when an access device is no longer present within the coverage area of the gateway 118, and may periodically update the database while an access device is within the coverage area of the gateway 118. The left path of the method of FIG. 7 then ends (block 728).

Referring now to the right path of FIG. 7, a broadband access gateway may receive identification information from an access device such as, for example, the access device 124, the wireless PDA 119, or the laptop 117 of FIG. 3. This may occur, for example, when the access device enters the coverage area of a broadband access gateway such as, for example, the gateway 118, or periodically while the access device is within the coverage area. At some later time, the gateway 118 may receive information identifying a calling party of a call received by the identified access device (block 716). The information identifying the calling party may comprise, for example, a directory number, an electronic serial number, an Internet protocol (IP) address, a media access control (MAC) address, an International Mobile Station Identifier (IMSI) address, and a Mobile Identification Number (MIN) address. Following receipt of the information identifying the calling party, the gateway 118 may search the database assembled by the activity of the left path, to identify possible sources of additional information related to the calling party (block 718). Next, the gateway 118 may retrieve information about the calling party from the identified sources using the information identifying the calling party (block 720). The gateway 118 may then select from the retrieved information those pieces of information desired by the called party (block 722). This may employ a set of information selection parameters such as, for example, those discussed above with regard to FIG. 6. The gateway may then deliver the selected information to the access device of the called party for display (block 726). The right path of the method of FIG. 7 then ends (block 728).

In one representative embodiment of the present invention, the incoming call may be received by the access device 124 via a wide-area network such as, for example, the GSM network 114 or CDMA network 112 of FIG. 1. The access device may then forward the calling party ID information to the gateway 118 via the personal area network supported by the wireless interface 120. In another representative embodiment of the present invention, the incoming call may be received by the access device 124 via the personal area network supported by the wireless interface 120. In this situation, service from a wide area network such as, for example, the GSM network 114 or CDMA network 112 of FIG. 1, may have been transitioned to the personal area network supported by gateway 118 and wireless interface 120, via a broadband connection such as, for example, the broadband connection 107, as described above. Information identifying the calling party may, for example, be intercepted by the gateway 118 in messaging exchanged with a wide area network such as, for example, the GSM network 114 or CMDA network 112 of FIG. 1, or the information identifying the calling party may be sent by the access device 124 to the gateway 118, upon receipt.

Although the exemplary embodiments of the present invention discussed above focus primarily on delivery of enhanced caller ID information to the called party, this does not represent a limitation of the present invention. Various representative embodiments of the present invention may support the delivery of selected multimedia information to a calling party based upon the identity of the called party. Delivery to the caller of enhanced called party information may be instead of or in addition to the delivery of enhanced caller information to the called party. The delivery of enhanced called party information to the calling party enables the calling party to more effectively communicate with the called party. For example, the called party information provided to the caller may include details of past calls, allowing the caller to continue in the relationship more effectively.

Aspects of the present invention may be found in a system supporting the delivery of enhanced caller identification information to a plurality of access devices. Such a system may comprise a gateway communicatively coupled to a broadband network and at least one wireless interface. The gateway may be capable of selectively exchanging multimedia information among the at least one wireless interface and the broadband network, and of communicating with the plurality of access devices via the at least one wireless interface. The gateway may be capable of collecting, from at least a portion of the plurality of access devices, information describing multimedia information available on the at least a portion of the plurality of access devices. The gateway may also be capable of receiving information identifying at least one of a called party and a calling party, and of searching the collected descriptive information using the received information identifying one of a called party and a calling party, to produce information associated with at least one of the called party and the calling party. The gateway may be capable of selecting from the information associated with at least one of the called party and the calling party based upon at least one user-defined parameter, and of delivering the selected information to at least one of the called party and the calling party.

In various representative embodiments of the present invention, the multimedia information may comprise at least one of streaming video, broadcast video, voice, digital data, text, digitized audio, digitized still images, digitized video, and digitized music. The information identifying at least one of a called party and a calling party may comprise at least one of a directory number, an electronic serial number, an Internet protocol (IP) address, a media access control (MAC) address, an International Mobile Station Identifier (IMSI) address, and a Mobile Identification Number (MIN) address. The at least one wireless interface may be compliant with the Bluetooth V1.2 or compatible personal area network (PAN) specification, may communicate using an unlicensed frequency band, and may communicate at a frequency of approximately 2.4 gigahertz. In addition, the at least one wireless interface may be compliant with at least one of the Institute of Electrical and Electronics Engineers (IEEE) 802.11a, 802.11b, 802.11g, and 802.11n standards. In various representative embodiments according to the present invention, the broadband network may comprise at least one of a digital subscriber line (DSL) network, a cable network, a satellite network, a cellular network, and the Internet, and the cellular network may comprise at least one of a global system for mobile communications (GSM) network, a time division multiple access (TDMA) network, a code division multiple access (CDMA) network, and a universal mobile telecommunications system (UMTS) network.

The gateway in a representative embodiment of the present invention may be capable of receiving from at least one of the plurality of access devices, at least one of information identifying an access device and information identifying a user. The information identifying a user may comprise at least one of a member identifier, a user name, an administrative identifier, and a credit card number. The information identifying an access device may comprise at least one of an electronic serial number, an Internet protocol (IP) address, a media access control (MAC) address, information identifying a make of an access device, and information identifying a model of an access device. The plurality of access devices may comprise at least one of a mobile multimedia handset, a personal digital assistant (PDA), a personal computer (PC), a digital scanner, a digital camera, a printer, headphones, and a pointing device. In a representative embodiment of the present invention, the information identifying at least one of a called party and a calling party may be received via the at least one wireless interface, and may be received via the broadband network. Delivering the selected information may be performed via at least one of the at least one wireless interface and the broadband network.

Additional aspects of the present invention may be observed in a method for delivering enhanced caller identification information to a plurality of access devices. Such a method may comprise collecting, from at least a portion of the plurality of access devices, information describing multimedia information available on the at least a portion of the plurality of access devices, and receiving information identifying at least one of a called party and a calling party. A representative embodiment of the present invention may comprise searching the collected descriptive information using the received information identifying one of a called party and a calling party, to produce information associated with at least one of the called party and the calling party. In addition, a representative embodiment according to the present invention may select from the information associated with at least one of the called party and the calling party based upon at least one user-defined parameter, and deliver the selected information to at least one of the called party and the calling party. A representative embodiment in accordance with the present invention may also comprise exchanging multimedia information among at least one wireless interface and a broadband network.

In a representative embodiment according to the present invention, the multimedia information may comprise at least one of streaming video, broadcast video, voice, digital data, text, digitized audio, digitized still images, digitized video, and digitized music. The information identifying at least one of a called party and a calling party may comprise at least one of a directory number, an electronic serial number, an Internet protocol (IP) address, a media access control (MAC) address, an International Mobile Station Identifier (IMSI) address, and a Mobile Identification Number (MIN) address. A representative embodiment of the present invention may also comprise exchanging multimedia information among at least one wireless interface and a broadband network. The at least one wireless interface may be compliant with the Bluetooth V1.2 or compatible personal area network (PAN) specification, may communicate using an unlicensed frequency band, and may communicate at a frequency of approximately 2.4 gigahertz. In addition, the at least one wireless interface may be compliant with at least one of the Institute of Electrical and Electronics Engineers (IEEE) 802.11a, 802.11b, 802.11g, and 802.11n standards. The broadband network may comprise at least one of a digital subscriber line (DSL) network, a cable network, a satellite network, a cellular network, and the Internet, and the cellular network may comprise at least one of a global system for mobile communications (GSM) network, a time division multiple access (TDMA) network, a code division multiple access (CDMA) network, and a universal mobile telecommunications system (UMTS) network.

A representative embodiment of the present invention may comprise receiving from at least one of the plurality of access devices, at least one of information identifying an access device and information identifying a user, where the information identifying a user may comprise at least one of a member identifier, a user name, an administrative identifier, and a credit card number. The information identifying an access device may comprise at least one of an electronic serial number, an Internet protocol (IP) address, a media access control (MAC) address, information identifying a make of an access device, and information identifying a model of an access device. In various representative embodiments according to the present invention, the plurality of access devices may comprise at least one of a mobile multimedia handset, a personal digital assistant (PDA), a personal computer (PC), a digital scanner, a digital camera, a printer, headphones, and a pointing device. The information identifying at least one of a called party and a calling party may be received via a wireless interface, and may be received via a broadband network. Delivering the selected information may be performed at least one of a wireless interface and a broadband network in a representative embodiment of the present invention.

Yet other aspects of the present invention may be observed in a machine-readable storage, having stored thereon a computer program having a plurality of code sections executable by a machine, for causing the machine to perform the operations of the method described above.

In a representative embodiment of the present invention, the wireless local area networks may include data networks such as, for example, Institute of Electrical and Electronics Engineer (IEEE) 802.11a/b/g/n compliant wireless networks such as those located in homes, hot spots or an office. Such local area networks may operate in unlicensed radio frequency spectrum such as in, for example, the 2.4 and 5 gigahertz regions. Examples of wide area networks may include cellular digital packet data (CDPD), voice and data networks such as public switched telephone networks (PSTN), Global System For Mobile Communication (GSM), GSM General Packet Radio Service (GPRS), GSM Short Message Service (SMS), GSM Enhanced Data Rates For Global Evolution (EDGE), North American Time Division Multiplex Access (TDMA), iDEN, Code Division Multiple Access (CDMA) and CDMA2000 1xRT, Universal Mobile Telecommunications System (UMTS) network, to name only a few.

A personal area network (PAN) may be formed by a plurality of wireless communication access devices such as, for example, mobile multimedia handsets, PDAs, telephones, and computers. Other elements of such a network may, for example, include computer peripherals such as digital scanners, digital cameras, printers, headphones, and pointing devices, that may be located within the immediate proximity of a person. A PAN may be an ad-hoc network of such communication devices. In a representative embodiment of the present invention, access devices within the PAN may communicate with other access devices within the PAN and also with other access devices that are located in other networks accessible via the PAN. The personal area networks may include data networks such as, for example, a Bluetooth compliant network, and Institute of Electrical and Electronics Engineer (IEEE) 802.15.3a compliant wireless networks. Such personal area networks may operate in unlicensed radio frequency spectrum such as, for example, the 2.4 and 5 gigahertz regions. Details of one example of a personal area network are provided in the document "Bluetooth Core Specification V1.2", Nov. 5, 2003, from Bluetooth SIG, Inc., the complete subject matter of which is hereby incorporated herein by reference, in its entirety. For example, in a Bluetooth® wireless PAN, a first Bluetooth®-enabled wireless access device may communicate with a second Bluetooth®-enabled wireless access device within the PAN. Additionally, either of the first and second Bluetooth®-enabled wireless access devices may communicate with the Internet or another LAN or WAN via the Bluetooth® wireless PAN.

In a representative embodiment of the present invention, a gateway may be adapted to provide seamless and transparent communication between a plurality of access devices and a plurality of networks. The functionality of the gateway may be divided, for example, into application content functionality, and configuration and management functionality. The application content functionality may, for example, deal with the types of applications that may be supported by the gateway as well as the various types of data that may be received, processed and/or transmitted by the gateway. In this regard, application content functionality may also include the manner in which other devices and/or systems may utilize data from the gateway.

Content and application services are important because all the information coming into and leaving the home from either the WAN side (i.e., the broadband connection side), or from the PAN side (i.e., the access device side) converges at the gateway. The PAN side may comprise Bluetooth, wireless LAN (IEEE 802.11a/b/g/n), IEEE 802.15.3a ultra-wideband, or cellular, for example. Notwithstanding, the gateway may be adapted to convert, for example, wirelessly received GSM-formatted information into, for example, Internet protocol (IP)-formatted information and in reverse, converts IP-formatted information into wireless GSM-formatted information suitable for over-the-air transmission. Support for other wireless communication protocols such as TDMA, CDMA, and UMTS may also be provided. In a representative embodiment of the present invention, the gateway may comprise suitable circuitry, logic and/or code that may be adapted to receive and process MPEG related data, which may be suitable for display on a screen. The gateway in an embodiment of the present invention functions as a focal point where data converges from a plurality of wired and wireless services. Although, in a particular embodiment of the present invention the gateway may do very little in terms of actual content aggregation, there is virtual aggregation of data. The converged data may be integrated and or otherwise utilized to offer unique opportunities for launching various content and application services from a single strategic location. Since the gateway in an embodiment of the present invention is the focal point where data converges, one or more protocol stacks may be employed for launching the various content and application services.

The gateway in a representative embodiment of the present invention may be adapted to route calls based on established rules that may be programmed into the gateway. For example, the gateway may be governed by a rule which states that local calls are to be routed to an incumbent local exchange carrier (iLEC), while long distance calls are to be handled by Long Distance Carrier Company. Accordingly, when a call originates at the gateway and it is determined that the call is a local call, the gateway may be adapted to route the call to the iLEC. However, if the gateway determines that the call is a long distance call, then the gateway may be adapted to route the call to Long Distance Carrier Company.

A representative embodiment of the present invention may leverage existing broadband infrastructure that is commonly found in many homes and businesses today. Because a consumer is already paying for the use of the broadband infrastructure in their home or office, leveraging the use of the existing broadband infrastructure for communication with wide area networks results in minimal or no communication costs. The broadband infrastructure may be, for example, a cable or DSL infrastructure.

The wireless interface function provided by the gateway located within a home, for example, may be utilized to route or communicate a great deal of traffic to a wired network such as a broadband network or a wireless network such as a GSM or CDMA network via a broadband connection. In other words, the wireless gateway infrastructure provided by a representative embodiment of the present invention provides a scalable network infrastructure that rides on an existing access infrastructure already supplied by a broadband service provider to a home, office or business. Additionally, the scalable infrastructure provided by the gateway also solves the problems associated with signal penetration and propagation, thereby providing improved quality of service (QoS). From a market perspective, a wireless service provider may now have access to the necessary infrastructure to provide improved wireless services to users within a home or office. Accordingly, in order to rapidly increase their growth, wireless service providers may now target that portion of the in-home landline or plain old telephone system (POTS) business, which have traditionally been handled by incumbent local exchange carriers (iLECs) or other LECs.

The unlicensed mobile access gateway described above may possess a significant amount of processing power. The gateways of existing systems fall short of realizing the full potential of the merged wired and wireless communication network that is enabled by a representative embodiment of the present invention. Numerous basic and enhanced communication services may be enabled or provided by the gateway. Support for access devices such as, for example, mobile multimedia handsets and PDAs may be involved in order to utilize these basic and enhanced communication services enabled by the new wave of digital technologies. Current and/or proposed mobile access gateway systems, however, do not provide the range of support needed for their use by the everyday consumer.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system supporting the delivery of information to a plurality of access devices, the system comprising:
   a gateway collecting, from at least a portion of the plurality of access devices, information about various multimedia information sources accessible to the gateway and available on the at least a portion of the plurality of access devices, wherein the collected information comprises metadata;

the gateway searching the collected information using information identifying one or both of a called party and/or a calling party, to identify potential sources of multimedia information associated with one or both of the called party and/or the calling party;

the gateway retrieving from the identified potential information sources, multimedia information associated with one or both of the called party and/or the calling party; and the gateway delivering the retrieved multimedia information to one or both of the called party and/or the calling party.

2. The system according to claim 1, wherein the gateway is communicatively coupled to a broadband network and at least one wireless interface, the gateway selectively exchanging multimedia information among the at least one wireless interface and the broadband network, and communicating with the plurality of access devices via the at least one wireless interface.

3. The system according to claim 2, wherein the at least one wireless interface is compliant with the Bluetooth V1.2 or compatible personal area network (PAN) specification.

4. The system according to claim 2, wherein the at least one wireless interface communicates using an unlicensed frequency band.

5. The system according to claim 2, wherein the at least one wireless interface communicates at a frequency of approximately 2.4 gigahertz.

6. The system according to claim 2, wherein the at least one wireless interface is compliant with one or more of the Institute of Electrical and Electronics Engineers (IEEE) 802.11a, 802.11b, 802.11g, and/or 802.11n standards.

7. The system according to claim 2, wherein the broadband network comprises one or more of a digital subscriber line (DSL) network, a cable network, a satellite network, a cellular network, and/or the Internet.

8. The system according to claim 7, wherein the cellular network comprises one or more of a global system for mobile communications (GSM) network, a time division multiple access (TDMA) network, a code division multiple access (CDMA) network, and/or a universal mobile telecommunications system (UMTS) network.

9. The system according to claim 2, wherein the information identifying one or both of the called party and/or the calling party is received via the at least one wireless interface.

10. The system according to claim 2, wherein the information identifying one or both of the called party and/or the calling party is received via the broadband network.

11. The system according to claim 2, wherein the gateway delivers the selected information via one or both of the at least one wireless interface and/or the broadband network.

12. The system according to claim 1, wherein the gateway receives the information identifying one or both of: the called party and/or the calling party.

13. The system according to claim 1, wherein the gateway retrieves from the identified potential information sources, multimedia information associated with one or both of the called party and/or the calling party based upon at least one user-defined parameter.

14. The system according to claim 1, wherein multimedia information comprises one or more of streaming video, broadcast video, voice, digital data, text, digitized audio, digitized still images, digitized video, and/or digitized music.

15. The system according to claim 1, wherein the information identifying one or both of the called party and/or the calling party comprises one or more of a directory number, an electronic serial number, an Internet protocol (IP) address, a media access control (MAC) address, an International Mobile Station Identifier (IMSI) address, and/or a Mobile Identification Number (MIN) address.

16. The system according to claim 1, wherein the gateway receives from at least one of the plurality of access devices, one or both of information identifying an access device and/or information identifying a user.

17. The system according to claim 16, wherein the information identifying a user comprises one or more of a member identifier, a user name, an administrative identifier, and/or a credit card number.

18. The system according to claim 16, wherein the information identifying an access device comprises one or more of an electronic serial number, an Internet protocol (IP) address, a media access control (MAC) address, information identifying a make of an access device, and/or information identifying a model of an access device.

19. The system according to claim 1, wherein the plurality of access devices comprises one or more of a mobile multimedia handset, a personal digital assistant (PDA), a personal computer (PC), a digital scanner, a digital camera, a printer, headphones, and/or a pointing device.

20. The system according to claim 1, wherein the information delivered to the plurality of access devices is enhanced caller identification (ID) information that comprises selected multimedia information from other access devices or from sources accessible via a broadband network.

21. The system according to claim 20, wherein the enhanced called ID information comprises one or more of a caller's name, directory number, general location and/or time of call.

22. The system according to claim 21, wherein the gateway determines the appropriate caller ID information to display on at least one of the plurality of access devices.

23. The system of claim 22, wherein the gateway displays reverse caller ID information on both a caller's and called party's access device.

24. The system of claim 20, wherein at least one of the plurality of access devices comprises a database that is used to identify sources of multimedia information that are used to facilitate the enhanced caller ID information.

25. The system of claim 24, wherein the database comprises a collection of information about the sources of multimedia information accessible to the gateway.

26. A method for delivering information to a plurality of access devices, the method comprising:

collecting, from at least a portion of the plurality of access devices, information about various multimedia information sources accessible to the gateway and available on the at least a portion of the plurality of access devices, wherein the collected information comprises metadata;

searching the collected information using information identifying one or both of a called party or a calling party, to identify potential sources of multimedia information associated with one or both of the called party and/or the calling party;

retrieving from the identified potential information sources, multimedia information associated with one or both of the called party and/or the calling party; and delivering the retrieved multimedia information to one or both of the called party and/or the calling party.

27. The method according to claim 26, comprising receiving the information identifying one or both of the called party and/or the calling party.

28. The method according to claim 26, wherein the retrieving comprises retrieving from the identified potential information sources, multimedia information associated with one or both of the called party and/or the calling party based upon at least one user-defined parameter.

29. The method according to claim 26, wherein multimedia information comprises one or more of streaming video, broadcast video, voice, digital data, text, digitized audio, digitized still images, digitized video, and/or digitized music.

30. The method according to claim 26, wherein the information identifying one or both of the called party and/or the calling party comprises one or more of a directory number, an electronic serial number, an Internet protocol (IP) address, a media access control (MAC) address, an International Mobile Station Identifier (IMSI) address, and/or a Mobile Identification Number (MIN) address.

31. The method according to claim 26, comprising exchanging multimedia information among at least one wireless interface and a broadband network.

32. The method according to claim 31, wherein the at least one wireless interface is compliant with the Bluetooth V1.2 or compatible personal area network (PAN) specification.

33. The method according to claim 31, wherein the at least one wireless interface communicates using an unlicensed frequency band.

34. The method according to claim 31, wherein the at least one wireless interface communicates at a frequency of approximately 2.4 gigahertz.

35. The method according to claim 31, wherein the at least one wireless interface is compliant with one or more of the Institute of Electrical and Electronics Engineers (IEEE) 802.11a, 802.11b, 802.11g, and/or 802.11n standards.

36. The method according to claim 31, wherein the broadband network comprises one or more of a digital subscriber line (DSL) network, a cable network, a satellite network, a cellular network, and/or the Internet.

37. The method according to claim 36, wherein the cellular network comprises one or more of a global system for mobile communications (GSM) network, a time division multiple access (TDMA) network, a code division multiple access (CDMA) network, and/or a universal mobile telecommunications system (UMTS) network.

38. The method according to claim 26, comprising receiving from at least one of the plurality of access devices, one or both of information identifying an access device and/or information identifying a user.

39. The method according to claim 38, wherein the information identifying a user comprises one or more of a member identifier, a user name, an administrative identifier, and/or a credit card number.

40. The method according to claim 38, wherein the information identifying an access device comprises one or more of: an electronic serial number, an Internet protocol (IP) address, a media access control (MAC) address, information identifying a make of an access device, and/or information identifying a model of an access device.

41. The method according to claim 26, wherein the plurality of access devices comprises one or more of a mobile multimedia handset, a personal digital assistant (PDA), a personal computer (PC), a digital scanner, a digital camera, a printer, headphones, and/or a pointing device.

42. The method according to claim 26, wherein the information identifying one or both of the called party and/or the calling party is received via a wireless interface.

43. The method according to claim 26, wherein the information identifying one or both of the called party and/or the calling party is received via a broadband network.

44. The method according to claim 26, wherein delivering the selected information is performed via one or both of a wireless interface and/or a broadband network.

45. The method according to claim 26, wherein the information delivered to the plurality of access devices is enhanced caller identification (ID) information that comprises selected multimedia information from other access devices or from sources accessible via a broadband network.

46. The method according to claim 45, wherein the enhanced called ID information comprises one or more of a caller's name, directory number, general location and/or time of call.

47. The method according to claim 46, comprising determining the appropriate caller ID information to display on at least one of the plurality of access devices.

48. The method of claim 47, comprising displaying reverse caller ID information on both a caller's and called party's access device.

49. The method of claim 45, comprising identifying sources of multimedia information that are used to facilitate the enhanced caller ID information through a database of at least one of the plurality of access devices.

50. The method of claim 49, comprising collecting a collection of information about the sources of multimedia information on the database.

51. A non-transitory machine-readable storage, having stored thereon a computer program having a plurality of code sections for operating a gateway supporting the delivery of enhanced caller identification information to a plurality of access devices, the code sections executable by a machine for causing the machine to perform the operations comprising:
    collecting, from at least a portion of the plurality of access devices, information about various multimedia information sources accessible to the gateway and available on the at least a portion of the plurality of access devices, wherein the collected information comprises metadata;
    searching the collected information using information identifying one or both of a called party or a calling party, to identify potential sources of multimedia information associated with one or both of the called party and/or the calling party;
    retrieving from the identified potential information sources, multimedia information associated with one or both of the called party and/or the calling party; and
    delivering the retrieved multimedia information to one or both of the called party and/or the calling party.

52. The non-transitory machine-readable storage according to claim 51, comprising receiving the information identifying one or both of the called party and/or the calling party.

53. The non-transitory machine-readable storage according to claim 51, wherein the retrieving comprises retrieving from the identified potential information sources, multimedia information associated with one or both of the called party and/or the calling party based upon at least one user-defined parameter.

54. The non-transitory machine-readable storage according to claim 51, wherein multimedia information comprises one or more of streaming video, broadcast video, voice, digital data, text, digitized audio, digitized still images, digitized video, and/or digitized music.

55. The non-transitory machine-readable storage according to claim 51, wherein the information identifying one or both of the called party and/or the calling party comprises one or more of a directory number, an electronic serial number, an Internet protocol (IP) address, a media access control (MAC) address, an International Mobile Station Identifier (IMSI) address, and/or a Mobile Identification Number (MIN) address.

56. The non-transitory machine-readable storage according to claim 51, comprising exchanging multimedia information among at least one wireless interface and a broadband network.

57. The non-transitory machine-readable storage according to claim 56, wherein the at least one wireless interface is compliant with the Bluetooth V1.2 or compatible personal area network (PAN) specification.

58. The non-transitory machine-readable storage according to claim 56, wherein the at least one wireless interface communicates using an unlicensed frequency band.

59. The non-transitory machine-readable storage according to claim 56, wherein the at least one wireless interface communicates at a frequency of approximately 2.4 gigahertz.

60. The non-transitory machine-readable storage according to claim 56, wherein the at least one wireless interface is compliant with one or more of the Institute of Electrical and Electronics Engineers (IEEE) 802.11a, 802.11b, 802.11g, and/or 802.11n standards.

61. The non-transitory machine-readable storage according to claim 56, wherein the broadband network comprises one or more of a digital subscriber line (DSL) network, a cable network, a satellite network, a cellular network, and/or the Internet.

62. The non-transitory machine-readable storage according to claim 61, wherein the cellular network comprises one or more of a global system for mobile communications (GSM) network, a time division multiple access (TDMA) network, a code division multiple access (CDMA) network, and/or a universal mobile telecommunications system (UMTS) network.

63. The non-transitory machine-readable storage according to claim 51, comprising receiving from at least one of the plurality of access devices, one or both of information identifying an access device and/or information identifying a user.

64. The non-transitory machine-readable storage according to claim 63, wherein the information identifying a user comprises one or more of a member identifier, a user name, an administrative identifier, and/or a credit card number.

65. The non-transitory machine-readable storage according to claim 63, wherein the information identifying an access device comprises one or more of: an electronic serial number, an Internet protocol (IP) address, a media access control (MAC) address, information identifying a make of an access device, and/or information identifying a model of an access device.

66. The non-transitory machine-readable storage according to claim 51, wherein the plurality of access devices comprises one or more of a mobile multimedia handset, a personal digital assistant (PDA), a personal computer (PC), a digital scanner, a digital camera, a printer, headphones, and/or a pointing device.

67. The non-transitory machine-readable storage according to claim 51, wherein the information identifying one or both of the called party and/or the calling party is received via a wireless interface.

68. The non-transitory machine-readable storage according to claim 51, wherein the information identifying one or both of the called party and/or the calling party is received via a broadband network.

69. The non-transitory machine-readable storage according to claim 51, wherein delivering the selected information is performed via one or both of a wireless interface and/or a broadband network.

70. The non-transitory machine-readable storage according to claim 51, wherein the information delivered to the plurality of access devices is enhanced caller identification (ID) information that comprises selected multimedia information from other access devices or from sources accessible via a broadband network.

71. The non-transitory machine-readable storage according to claim 70, wherein the enhanced called ID information comprises one or more of a caller's name, directory number, general location and/or time of call.

72. The non-transitory machine-readable storage according to claim 71, comprising determining the appropriate caller ID information to display on at least one of the plurality of access devices.

73. The non-transitory machine-readable storage of claim 72, comprising displaying reverse caller ID information on both a caller's and called party's access device.

74. The non-transitory machine-readable storage of claim 70, comprising identifying sources of multimedia information that are used to facilitate the enhanced caller ID information through a database of at least one of the plurality of access devices.

75. The non-transitory machine-readable storage of claim 74, comprising collecting a collection of information about the sources of multimedia information on the database.

\* \* \* \* \*